United States Patent

[11] 3,627,954

[72] Inventor Thomas M Quinn
West Chicago, Ill.

[21] Appl. No. 686,024
[22] Filed Oct. 21, 1969
[45] Patented Dec. 14, 1971

[73] Assignee Bell Telephone Laboratories Incorporated
Murray Hill, Berkeley Heights, N.J.

[54] CALL-SIGNALING PROCESSOR IN A TELEPHONE-SWITCHING SYSTEM
6 Claims, 23 Drawing Figs.

[52] U.S. Cl. .......... 179/18 ES, 179/18 EB
[51] Int. Cl. .......... H04g 3/54
[50] Field of Search .......... 179/18 ES, 18 EB

[56] References Cited

UNITED STATES PATENTS

| | | | |
|---|---|---|---|
| 3,487,170 | 12/1969 | Pearce et al. | 179/18 ES |
| 3,409,742 | 11/1968 | Winter | 179/18 EB |
| 3,391,251 | 7/1968 | Marty | 179/18 EB |

*Primary Examiner*—Kathleen H. Claffy
*Assistant Examiner*—Thomas W. Brown
*Attorneys*—R. J. Guenther and R. B. Ardis

ABSTRACT: A program-controlled telephone switching system wherein dial pulse transmission to trunks is effected by a plurality of dial pulse sender circuits which are connected to terminals of the telephone-switching network. During outpulsing a connection is established through the network between a dial pulse sender circuit and a selected trunk circuit. Each such sender circuit is responsive to a start signal to transmit a sequence of dial pulses and is responsive to a stop signal to terminate the transmission of such dial pulses. A common source is provided for generating the dial pulses for all sender circuits. A record of the information to be outpulsed is maintained in a multiword-originating register in a bulk memory. A program-controlled processor generates the start and stop signals in accordance with information contained in the originating register. An autonomous wired logic processor repetitively alters a portion of the record in the originating memory at a rate which corresponds to the dial pulse rate and flags the program-controlled processor to generate the stop signal.

INVENTOR
T. M. QUINN
BY John C Albrecht
ATTORNEY 3,627,954

PROGRAMMING PLAN

CLOCK PULSES AND COMMAND TIMING PULSES

ORIGINATING REGISTER

TRANSIENT CALL REGISTER

TERMINAL MEMORY RECORD FORMAT

DATA SENDING TIMING
(TC COUNT SHOWN WITH LATEST PHASING)

CALL-SIGNALING PROCESSOR IN A TELEPHONE-SWITCHING SYSTEM

BACKGROUND OF THE INVENTION

1. Field of the Invention

This invention is concerned with program-controlled telephone switching systems and is concerned particularly with the collection and recording of call-signaling information from subscriber lines and with the generation and transmission of dial pulse call-signaling information to distant offices via trunk circuits.

2. Description of the Prior Art

In prior art electronic program-controlled telephone switching systems a single processor comprising a control unit and associated bulk memories all of the work functions of the system on a time division basis. In this and other comprising a control unit and art telephone switching systems dial pulse signals have been generated asynchronously by actions discrete to the trunk circuit over which outpulsing is being performed. In such systems dial-pulse-generating circuits, which are temporarily associated with a trunk circuit on an individual basis during outpulsing, operate in a random fashion. In one prior art telephone switching system outpulsing is performed by controlling a latching outpulsing relay of the trunk circuit. The program-controlled processor generates a discrete signal for each transition of each outgoing dial pulse to control the state of the outpulsing relay in the trunk circuit. In a situation wherein 10 pulse per second outpulsing is employed there are two such transitions per outgoing dial pulse and these transitions occur approximately 60 milliseconds apart in time during one pulse. The last transition of the one pulse and the first transition of the next pulse occur approximately 40 milliseconds apart in time. In the event that 20 pulse per second outpulsing is being employed these time intervals are halved. Where a large number of trunk circuits employ dial pulse outpulsing, the processor work load related to the control of outpulsing is substantial and occupies a meaningful percentage of the processor time.

SUMMARY OF THE INVENTION

In accordance with this invention, the telephone switching system comprises a plurality of dial pulse sender circuits which operate synchronously during outpulsing. The dial-pulse-sending circuits of this invention terminate on the telephone switching network and are selectively connected to a trunk circuit over which outpulsing is to be performed by a direct current path through the switching network. The outgoing trunk circuit is placed in the bypass state wherein there is a direct current transmission path between the network terminals to which the trunk circuit is connected and the trunk to the distant office. Additionally, when the trunk circuit is in the bypass state, the transmission path provided thereby is disconnected from all circuit elements of the trunk and subsequent supervision of the trunk during outpulsing is performed at the dial pulse sender circuit.

In accordance with this invention the outgoing dial pulse transitions are derived from a common timing source and the program-controlled processor merely initiates dial pulsing on a trunk and at an appropriate time after initiation stops the sending of the dial pulses. Dial pulsing is initiated by applying a control signal to a dial pulse sender circuit and dial pulsing by that sender circuit is terminated by removing the control signal. A record of the information to be outpulsed is maintained in an originating register which comprises a plurality of words in a shared bulk memory. The program-controlled processor examines the recorded call-signaling information and subsequently selects the digits thereof which are to be employed in outpulsing. The value of a selected digit, modified by a standard amount, is inserted in one portion of the originating register which portion is termed the "outpulsing count area." During the time that a sender circuit is enabled, a separate wired logic control circuit which serves all originating registers of the office decrements the count in the "outpulsing count area" at a rate which corresponds to the rate at which outpulsing is being performed. For example, if 10 p.p.s. outpulsing is being performed, the wired logic processor will decrement the count in this area by a count of one once every 100 milliseconds. Decrementing is performed independently of the actual outpulsing and the time of decrementing with respect to the dial pulse transitions may vary substantially from one dial pulse period to the next. The wired logic processor is arranged to recognize when the count in the outpulsing count area has reached a critical value which value corresponds to the amount by which the call-signaling information was modified at the time the information was placed in the outpulsing count area. Upon recognition of the critical count, the wired logic processor sets a flag in the originating register to alert the program-controlled processor that outpulsing may be terminated. The program-controlled processor examines the flags of the originating registers and upon finding a flag in the "1" state takes steps to interpret the meaning of the flag, and if proper to remove the control signal from a dial pulse sender circuit to terminate dial pulse sending.

Advantageously, in accordance with this invention, the program-controlled processor need generate only two commands for controlling a dial pulse sender during the transmission of each dial pulse digit. In prior art systems, the program-controlled processor is required to transmit two such commands for each pulse of each digit. Accordingly, by this invention there are substantial savings in the processor time dedicated to the dial-pulse-sending function.

The above and other objects and features of this invention will be more readily understood from the following description when read with respect to the drawing in which:

FIG. 1 is a block diagram which shows the switching network, the peripheral access circuits and the temporary memory access circuits;

FIGS. 2 through 5 comprise a schematic diagram of the program-controlled main processor;

GENERAL DESCRIPTION

Figure 10:
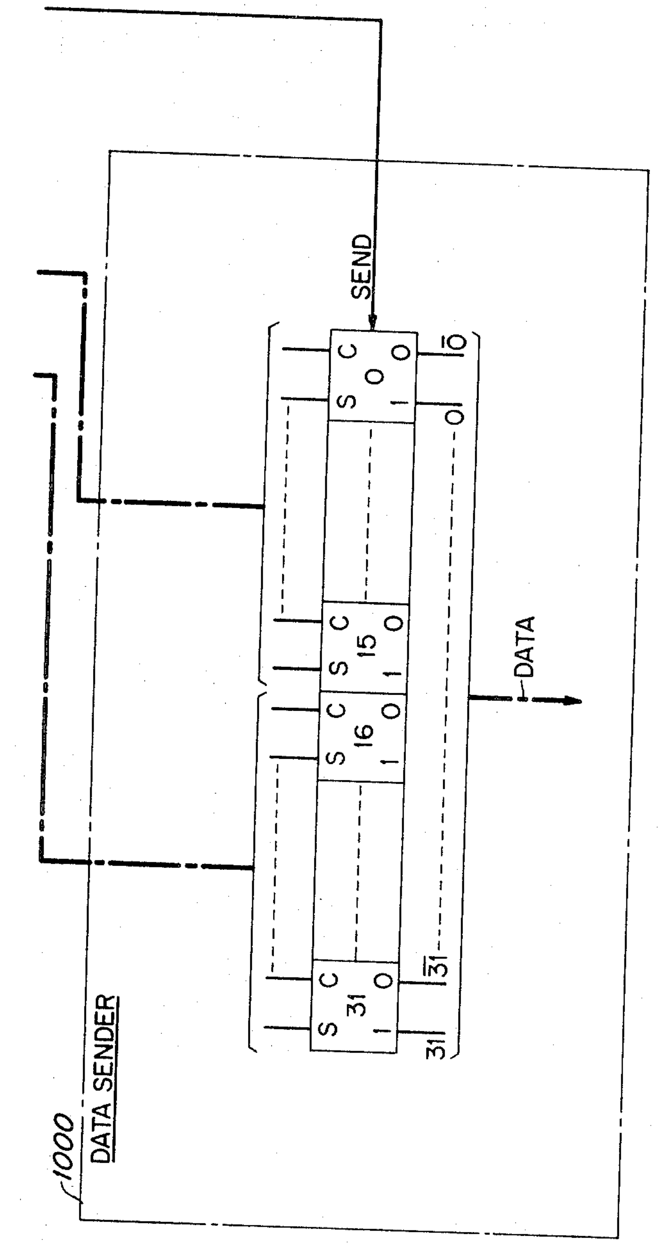
FIG. 10 is a block diagram of a data sender arrangement.

The communication switching system employed herein to illustrate the principles of this invention serves local Subscriber Lines 100, 101 and Trunks 121, 122 to distant offices. In serving the local lines and the trunks, call-signaling information originating with both the lines and the trunks must be detected and interpreted and appropriate control actions initiated in accordance therewith. In addition to the input information which originates with the lines and the trunks, the illustrative switching system receives data (see FIG. 11) from a plurality of data sources and is arranged to transmit data (see FIG. 10)

to a corresponding plurality of data users. The illustrative switching system includes a complex maintenance facility which also generates a large amount of data which must be processed and interpreted. This maintenance facility and the communication therewith are not described herein since an understanding thereof is not essential to the teachings of the present invention.

Figure 11:
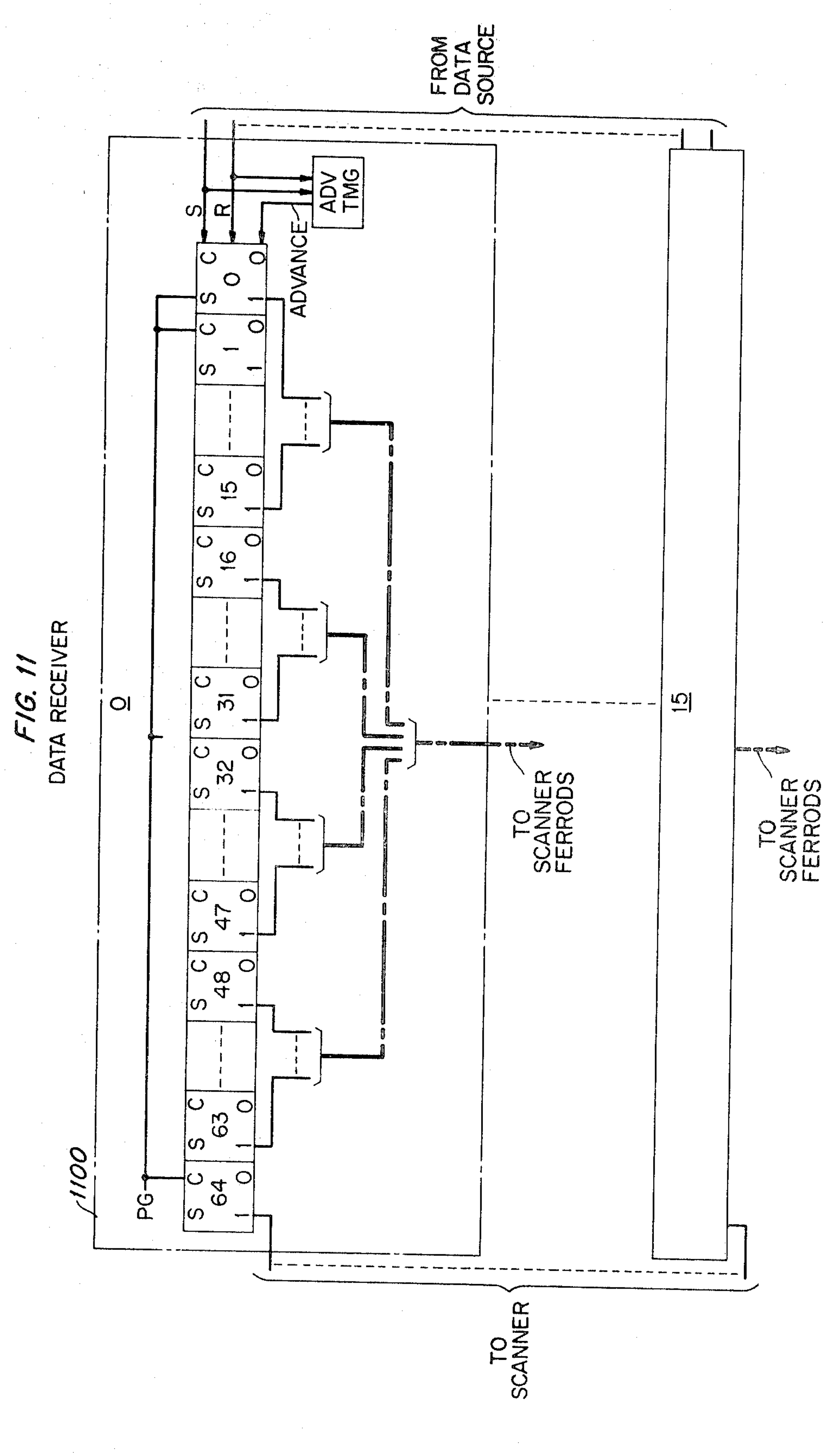
FIG. 11 is a block diagram showing data-receiving arrangements employed herein.

The two major sources of input information comprise the Scanners 130, 131, 105 and the data receivers of FIG. 11. The output devices employed herein comprise the Peripheral Access Circuit 120 and the Data Sender 1000.

The nature of the data which is transmitted via the Data Sender 1000 and the generation of this data will not be considered in detail herein. It is sufficient to note that data transmitted by these arrangements may be utilized in the control of remote switching units and in communication between the arrangements of FIGS. 1–11 and other switching centers. In the illustrative embodiment of this invention data is transmitted on a maximum of 32 channels at a rate of approximately 800 bits per channel per second. The data received via the data receiver arrangement of FIG. 11 and the utilization thereof similarly is not detailed herein but rather it is sufficient to note that such data may comprise information from a remote switching unit or data from a distant switching center.

The input and output functions of the illustrative switching system may be classified in accordance with the rate at which such functions occur and the precision with which such functions must be correlated with the passage of time. Advantageously, in accordance with this invention the functions which require the highest repetition rate and the highest degree of timing precision are performed by the wired logic input-output arrangements of FIGS. 6–9. This results in substantial savings in complexity and in time in the operation of the Program Controlled Processor 200 of FIGS. 2–5.

In a system in which the functions which are performed with a high degree of timing precision are implemented by means of a stored program processor, substantial time is expended in monitoring function clocks or in executing program interrupts which are initiated in accordance with such function clocks. For example, in one prior art telephone switching system program interrupts occur at 5-millisecond intervals to assure orderly and timely completion of input-output work functions (e.g., dial pulse detection, dial pulse sending). In this prior art system there is no provision for data sending and receiving apart from the call-signaling information occurring on subscriber lines and on trunk circuits. Advantageously, in accordance with the present invention program interrupts, other than maintenance interrupts, occur once every 25 milliseconds rather than at the prior rate of once every 5 to 10 milliseconds. The program interrupt facility will be discussed later herein with respect to the overall call processing plan employed in providing telephone service by means of the arrangements of FIGS. 1–11.

Figure 14:
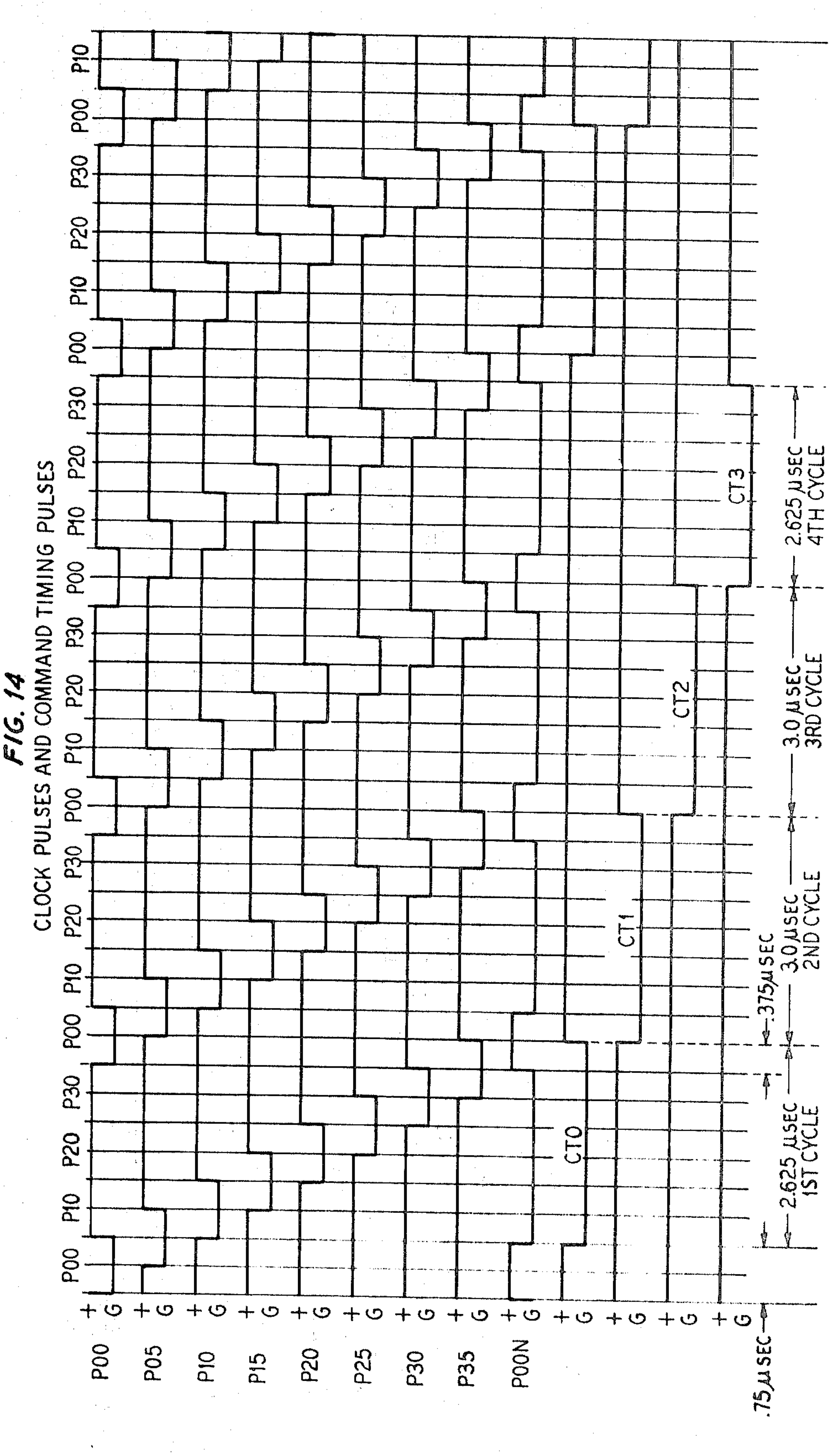
FIG. 14 is a timing diagram.

As seen in FIG. 14, a basic machine cycle of 3 microseconds is employed. The Clock 504 of FIG. 5 generates eight phases of clock pulses. Each clock pulse has a duration of 0.75 microseconds and the clock pulses overlap each other by one-half of the clock pulse period or 0.375 microseconds. The labels shown in FIG. 14 are employed in this description and in the drawing. Certain of the instructions of the instruction set executed by the Program-Controlled Processor require only 3 microseconds for execution. Other instructions of the instruction set perform more complex operations and require a number of 3-microsecond machine cycles for their execution. The number of machine cycles varies from two through six. Instructions which require access to the shared Memory 21 and the Peripheral Access Circuit 120 require a maximum of four machine cycles (12 microseconds) for execution.

Figure 2:
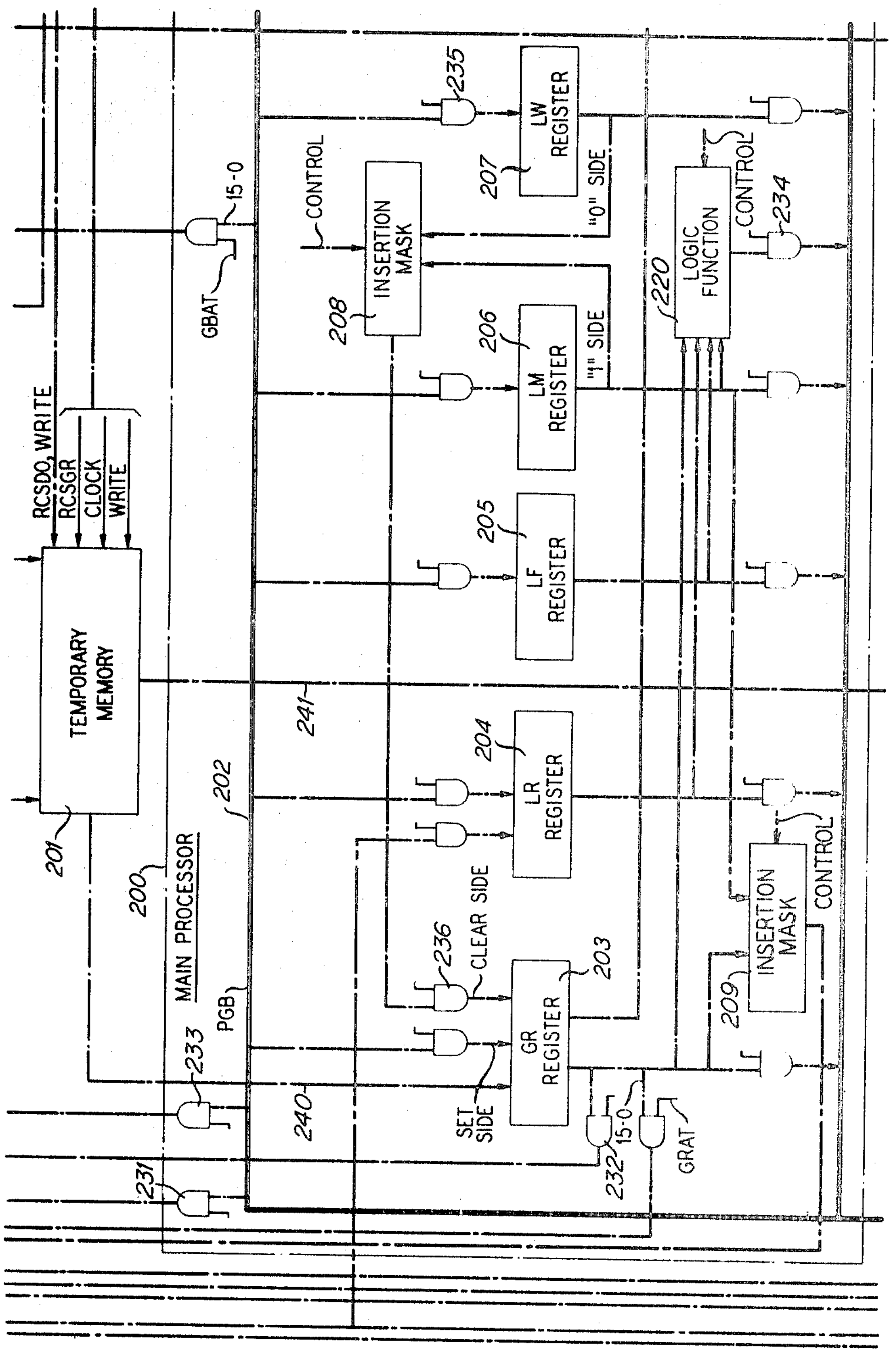
Figure 3:
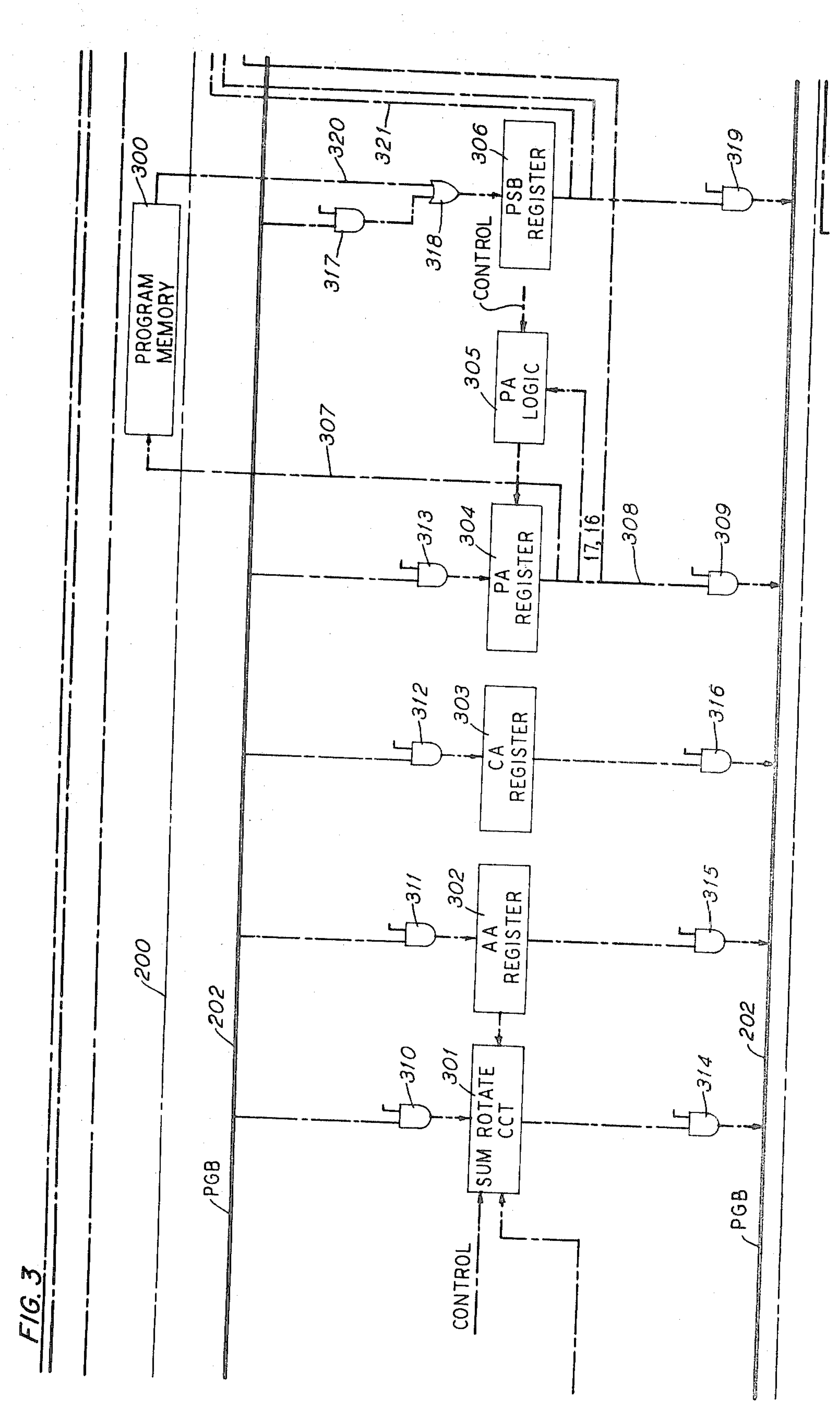
Figure 4:
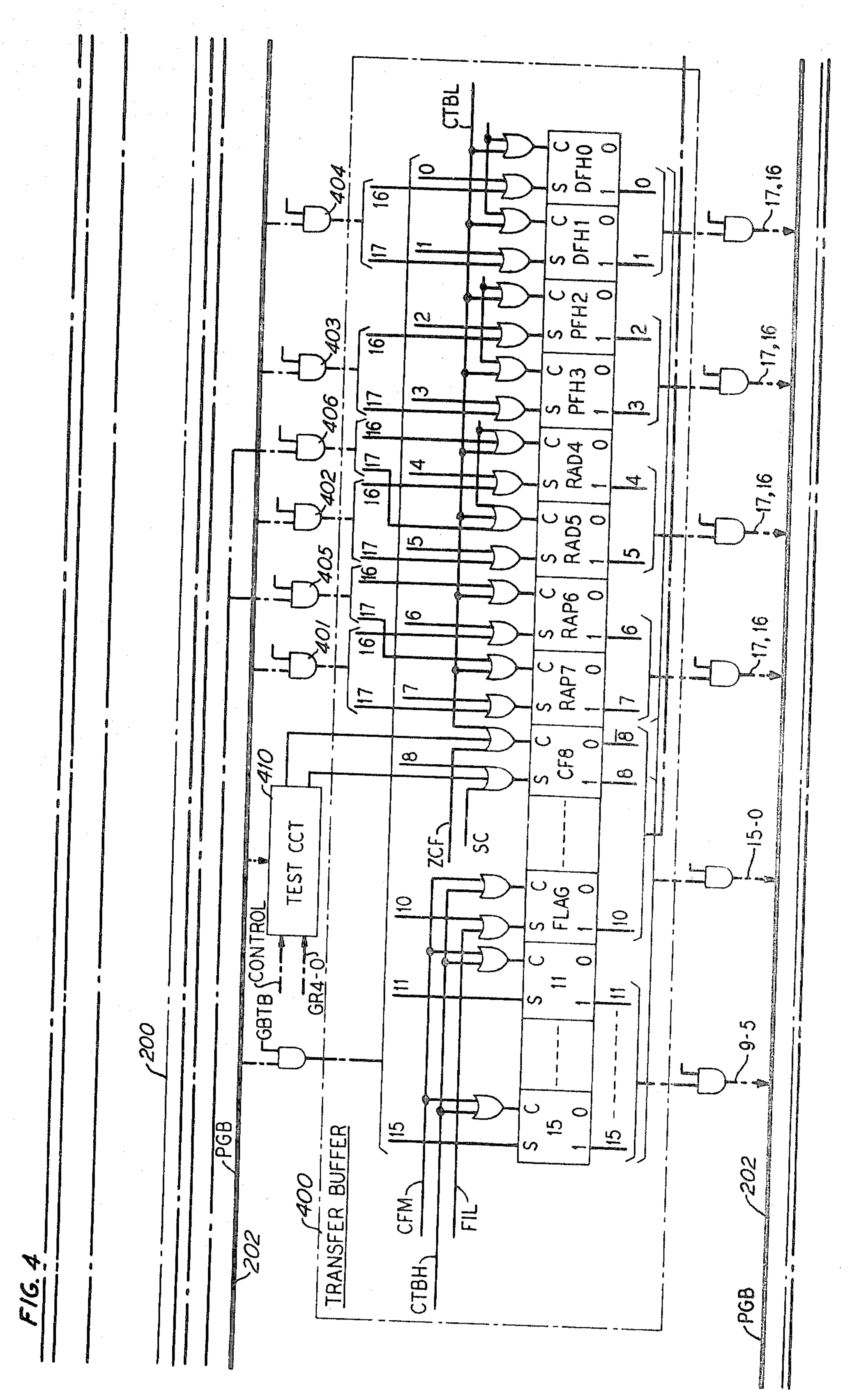
Figure 5:
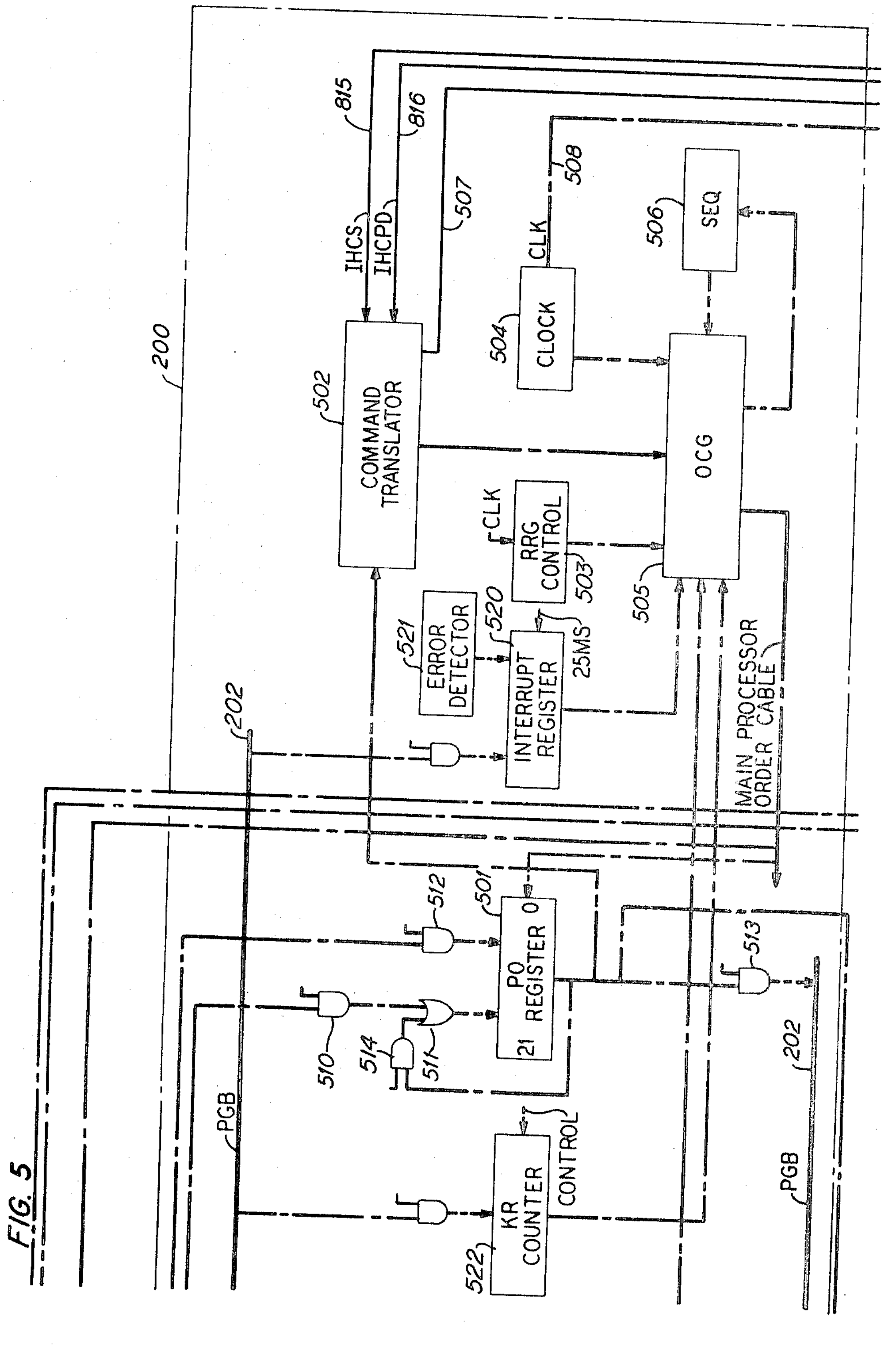

The Wired Logic Processor 600 of FIGS. 6–9 utilizes the clock pulses generated by the Clock Circuit 504 and in addition generates timing sequences which are discretely related to the jobs assigned to the Wired Logic Processor. The Program-Controlled Processor 200 and the Wired Logic Processor 600 share a Temporary Memory 201 which is shown in FIG. 2. The Wired Logic Processor requires 12 microseconds for the completion of its tasks which require access to the Temporary Memory 201. Whenever the Wired Logic is afforded access to the Temporary Memory 201, the Program-Controlled Processor is precluded from accessing the Temporary Memory 201 for a period of 12 microseconds. Accordingly, under certain conditions, the Program-Controlled Processor may be forced to sit in an idle state for a period of time up to 9 microseconds, while waiting for access to the shared Temporary Memory 201. A detailed discussion of the accessing of the Temporary Memory 201 is set forth later herein.

Before proceeding to a discussion of the operation of the Program-Controlled Processor and of the Wired Logic Processor, it is essential to have an understanding of the work functions which are assigned to the Wired Logic Processor, including the repetition rates and timing precision requirements of these work functions and an understanding of the communication between the Wired Logic Processor and the Program-Controlled Processor.

DATA SENDING

The Data Sender 1000 is capable of handling 32 data channels having a bit rate of approximately 800 bits per second per channel. Of the work functions assigned to the Wired Logic Processor, the data-sending function has the highest work repetition rate and the highest degree of required timing precision. The Wired Logic Processor serves to address the Temporary Memory 201 to obtain two 16-bit data words during each minor cycle. The first data word is associated with sending circuits 0 through 15 of the Data Sender 1000 while the second data word is associated with the data-sending circuits 16–31 thereof. The sending circuits 0–31 are enabled by a signal on the Send Conductor 820. This signal occurs at the end of each 1.251-millisecond minor cycle. The Wired Logic Processor 600 defines major cycles having a time duration of 10.008 milliseconds and each such major cycle comprises eight minor cycles having a time duration of 1.251 milliseconds. The repetition rate of the signal on Conductor 820 is approximately 800 pulses per second and thus corresponds to the rate at which data is transmitted by means of the Data Sender 1000.

Data sending is performed during each minor cycle and constitutes a portion of the quota work of the Wired Logic Processor 600. Since the data-sending work must be completed prior to the occurrence of the signal on the Send Conductor 820, this work is termed nondeferrable quote work herein. In this illustrative switching system data sending is the only nondeferrable quota work. However, in other systems utilizing the invention additional nondeferrable quota work may be assigned to the input-output Wired Logic Processor 600.

A data message comprising 64 serial bits is stored in the same bit position in 64 successive locations in the Temporary Memory 201. Accordingly, 64 successive memory words serve to store 16 such data messages. The 64th memory location is employed to store a code which marks the end of a message or the idle state. Since there are 32 data senders (0–31) in the Data Sender 1000 there is a requirement for 128 work locations in the Temporary Memory 201 for the storing of the corresponding 32 serial messages. In this particular illustrative embodiment the 32 messages are stored at call store addresses decimal 256 through decimal 383. The words at memory locations 256 through 319 are employed to store the 16 serial messages for the sender circuit 0–15 while the memory address locations 320 through 383 are employed to store the data messages for the data sender circuits 16 through 31.

SERVICING ORIGINATING REGISTERS

As will be explained more fully later herein, the Lines 100, 101 and the Trunks 121, 122 are examined approximately once every 100 milliseconds to detect requests for service.

When a request for service is detected the Program Controlled Processor 200 assigns an idle originating register to the request. In the illustrative switching system there are provisions for a maximum of 128 originating registers and each originating register comprises eight successive words in the Temporary Memory 201. The organization of information and the significance of the information in an originating register is set forth in FIG. 15.

Control information is communicated from the Program Controlled Processor 200 to the Wired Logic Processor 600 by means of the first word of an originating register and input data and control information is transmitted from the Wired Logic Processor 600 to the Program Controlled Processor 200 by way of the second word of each originating register. Words 3 through 8 of an originating register are employed solely by the Program Controlled Processor 200. The significance of the various elements of the originating register, as set forth in FIG. 15, will be discussed with respect to digit reception and digit transmission, respectively.

DIGIT RECEPTION

Call-signaling information originating with both lines and trunks comprises a sequence of digits which define the call destination. A call from a Subscriber 101 may be to another subscriber in the same office, to a subscriber in a distant office or to a service facility such as an operator. A call which originates from a distant office or from an operator reaches the switching system via one of the Trunk Circuits 121, 122. Each sequence of call-signaling digits must be detected, recorded and interpreted. In accordance with the present invention the digits of a sequence are detected by means of the Wired Logic Processor 600 which stores this information in the originating register assigned to the line or trunk. Subsequently, the stored Program Controlled Processor 200 moves the received information within the originating register and examines the sequence of digits in order to formulate control actions for establishing the necessary connections within the office and for generating sequences of call-signaling digits to be transmitted to other offices.

In this particular switching system a 16-bit data word is employed and each word stored in the Temporary Memory 201 comprises 16 bits termed bits 0 through 15. At the same time that the Program Controlled Processor 200 assigns an idle originating register to a request for service, it also assigns and connects an idle call-signaling receiver to the line-requesting service. Call-signaling information from Subscriber Lines 100, 101 may be in the form of dial pulse digits or TOUCH-TONE digits. Dial pulse digits comprise sequences of pulses which may occur at a rate of 10 to 20 pulses per second. A typical dial pulse has an on-hook to off-hook ratio such that the off-hook time comprises approximately 60 percent of the dial pulse intervals.

Each digit of a TOUCH-TONE digit sequence is represented by a pair of discrete voice frequency tones which are generated locally within a subscriber's station apparatus. When a request for service from a line is detected, the Program Controlled Processor 200 must examine translation information relative to the requesting line to determine what type of call-signaling receiver should be connected to the requesting line. A Subscriber Line may be terminated solely in dial pulse station apparatus, solely in TOUCH-TONE station apparatus or instruments of both types may be connected to a single line. In the first case, a dial pulse call signal receiver is assigned to the requesting line and a connection is established through the network between the requesting line and the assigned dial pulse receiver. Similarly, if the translation information for the requesting line indicates the presence of TOUCH-TONE station apparatus, either alone or in combination with dial pulse station apparatus, the Program Controlled Processor 200 assigns a combined Dial PUlse TOUCH-TONE digit receiver to the requesting line. In each instance when a digit receiver, either dial pulse, or combined, is assigned to a requesting line the identity of the digit receiver is placed in the first word of the corresponding assigned originating register by the Program Controlled Processor 200. Furthermore, the Program-Controlled Processor places data in bit 15 of the first word of the originating register to indicate the type of digit receiver that is being employed. In the event that a dial pulse digit receiver is connected to the calling line, bit 15 is set to the "0" state. However, if TOUCH-TONE digits may be received a "1" is placed in bit 15 to indicate that a combined dial pulse TOUCH-TONE receiver has been assigned. In the latter case the Wired Logic Processor 600 observes information obtained from the digit receiver to determine whether the associated line is transmitting dial pulses or TOUCH-TONE digits. There is no requirement for intervention of the Program Controlled Processor 200 since the Wired Logic Processor 600 is arranged to place the appropriate digit representation in Word 2 of the originating register.

At this time it should be noted that the Scanners 130, 131, 105 are each arranged to interrogate 1024 ferrods arranged in 64 rows of 16 ferrods each. In the illustrative switching system there are a total of eight scanners and each such scanner comprises a matrix of ferrods for terminating direct current circuits to be supervised and control means for transmitting an output word which comprises indicia representative of the states of a selected group (scanner row) of supervised circuits in response to a command which identifies the scanner and the row within the scanner. A ferrod comprises an apertured stick of ferromagnetic material having control, interrogate and readout windings. The control windings are placed in series with direct current electrical circuits which indicate the state of the supervised circuit. For example, where a ferrod is employed to supervise a subscriber's line, the ferrod is placed in series with a source of direct current and with the line conductors and the subscriber's station apparatus. When the subscriber's apparatus is in the on-hook state there is no current flowing in the ferrod control lining and when the subscriber's apparatus is in the off-hook state current does flow in the associated ferrod control winding. The interrogate and readout windings comprise individual conductors which thread through the two apertures of the ferrod. Both the interrogate conductor and the readout conductor are threaded through both apertures. An interrogate signal comprising a bipolar pulse applied to the interrogate conductor causes an output signal in the readout conductor of every ferrod which is supervising a circuit which is in the on-hook state. If the ferrod is supervising a circuit in the off-hook state (current is flowing in the line) a readout pulse is not generated due to the saturation of the ferrod. Each scanner comprises two control circuits and one bit of a scanner command indicates which of the control circuits is to be employed in response to the command. Both control circuits serve all rows of the scanner and such duplication is provided merely to improve system reliability.

As previously indicated herein there are a maximum of 128 originating registers employed in the illustrative system and there are eight minor cycles in each major time cycle of 10.008 microseconds. Each originating register must be served once per major time cycle. Sixteen originating registers are serviced during each minor cycle. Therefore, the servicing of originating registers is distributed evenly among the minor time cycles.

The functions of the Wired Logic Processor 600, with respect to the preparation of the Data Sender 1000, must be completed prior to the occurrence of the send pulse on Conductor 820. Thus the work associated with the preparation of the Data Sender 1000 is termed nondeferrable quote work. The work associated with the servicing of a group of originating registers need not be completed within such a strict timing schedule, however, this work must be performed on an orderly basis. In the illustrative example described herein the servicing of an originating register requires 12 microseconds and in the event that the servicing of originating registers has not been completed prior to the end of a minor cycle this work is immediately undertaken at the beginning of the next minor cycle and may extend for a maximum period of 192 microseconds (16 originating registers × 12 microseconds per register) into the next minor cycle. The work associated with the servicing of originating registers, since it may be deferred beyond the end of the minor cycle, is termed deferrable quota work herein. The servicing of an originating register may comprise digit reception or digit transmission and in certain instances both digit reception and digit transmission are performed together. The details of digit reception and digit transmission are set forth later herein.

NONQUOTA WORK

In addition to the quote work described above the Wired Logic Processor 600 is employed to scan the Subscriber's Lines 100, 101 and the Trunks 121, 122 to detect requests for service. Requests must be detected within a reasonable time after they occur. Therefore lines and trunks are routinely scanned approximately once every 100 milliseconds. The Subscriber Line Circuits and the Trunk Line Circuits employed herein are arranged so that any line which exhibits an off-hook supervisory state during request for service scanning may be considered as representing a request for service. This is possible since once a request for service has been detected the ferrod which is examined during request for service scanning is disconnected so that while a line or trunk is in the talking or served state, that ferrod will give an on-hook indication.

The Program Controlled Processor 200 initiates request for service scanning by placing a scanner identity in the EA register 700 of the Wired Logic Processor 600. The Program-Controlled Controlled Processor also sets the Scanning Control flip-flop 802 to indicate that the Wired Logic Processor 600 may undertake request for service scanning whenever conditions permit. Request for service scanning requires access to the Peripheral Access Circuit, however, this work function does not require access to the Temporary Memory 201. There is a rule of action built into the Wired Logic Processor 600 which dictates that request for service scanning proceeds whenever the Wired Logic Processor 600 is not performing quota work and the Program Controlled Processor 200 does not require access to the Peripheral Access Circuit 120. Request for service scanning proceeds until one of the following occurs: (a) a line or trunk is found to be in the off-hook state; (b) all rows of the scanner have been interrogated; or (c) line scanning is interrupted by the Program-Controlled Processor.

ALLOCATION OF TIME WITHIN A MINOR CYCLE

The requirements of the stored Program Processor 200 and the Wired Logic Processor 600 are such that all of the quota work assigned to the Wired Logic Processor 600 is completed prior to the end of its minor cycle during a majority of minor cycles. Furthermore, during most minor cycles it is possible for the Wired Logic Processor 600 to undertake request for service scanning which, in the illustrative switching system, comprises the nonquota work. In the event that conditions are such that the quote work is not completed prior to 24 microseconds before the end of a minor cycle, definite action must be undertaken to complete at least the nondeferrable quota work prior to the end of the minor cycle. The time interval of 24 microseconds is directly related to the time required to perform the nondeferrable quota work. In a system in which additional nondeferrable quota work is assigned to the Wired Logic Processor 600 additional time must be reserved at the end of each minor cycle. Furthermore, in the present illustrative switching system certain quota work may be deferred until the initial portion of the immediately succeeding minor cycle. However, whenever quota work from one minor cycle remains undone at the beginning of the next minor cycle, that work is immediately completed and the normal priority afforded the Program-Controlled Controlled Processor during the first portion of a minor cycle is negated. Immediately after completion of the quota work access priority is restored to the Program Controlled Processor 200.

During the periods of time in which the Program Controlled Processor 200 has priority in accessing the Temporary Memory 201 the control arrangement of FIGS. 1–10 is termed to be operating in the "NORMAL" mode. During of 408, AND-gate 803 will be enabled at time 1227 microseconds of the minor cycle and will set the FORCE flip-flop 806 to the "1" state. When the FORCE flip-flop 806 is set, the Wired Logic Processor 600 seizes control of the shared Temporary Memory 201 as soon as the Program Controlled Processor 200 has completed the execution of its current instruction if that instruction required use of the shared Memory 201. In the event that the current instruction being executed by the Processor 200 did not require use of the shared Memory 201, the Wired Logic Processor 600 immediately undertakes the processing of any remaining quota work.

The fact that quota work remains to be done is signified by the WAIT flip-flop 808 being in the "0" state. The completion of data sending (nondeferrable quota work), is signified by the enabling of Conductor 830 and the time Conductor A. The completion of the originating register service (deferrable quota work) is signified by the enabling of the AND-gate 831.

The digit data address Counter 703 is a 6-bit counter which is employed to maintain a record of the number of originating registers that have been served in a minor cycle. In the present case 16 originating registers are served during each minor cycle, therefore, when the Counter 703 reaches the all "1" state the completion of the deferrable quota work is signified. The output of AND-gate 831 is a further input to the AND-gate 805 which is enabled at time P30. Thus, when the digit data address Counter 703 has reached the count of 15 and Conductor 830 has been enabled, the WAIT flip-flop 808 will be set to its "1" state.

For purposes of the present discussion, it is assumed that the WAIT flip-flop 808 is in the "0" state at the time the FORCE flip-flop 806 is set to its "1" state. In this example the FORCE flip-flop is set to its "1" state 24 microseconds prior to the end of the minor cycle although only 12 microseconds is required by the Wired Logic Processor 600 for execution of the data-sending work (nondeferrable quota work). The 12 microsecond time difference is to allow for completion of execution of any Program-Controlled Processor instruction which has required access to the shared Memory 201 or to the Peripheral Access Circuit 120. The Program Controlled Processor 200 processes sequences of instructions which are stored successively in the PO Register 501. The Command Translator 502 interprets the instruction portion of each order placed in the PO Register 501 and generates direct current gating signals which are combined with clock pulses and other control signals in the Order Combining Gate Circuit 505. Additionally, for those program orders which require that the Program Controlled Processor 200 have access to the shared Memory 201 or to the Peripheral Access Circuit 120, the Command Translator 502 will enable the Conductor 507. A signal on Conductor 507 serves to inhibit the AND-gates 809 and 814 in the Wired Logic Processor 600.

When the FORCE flip-flop 806 is set to the "1" state and the WAIT flip-flop 808 is in the "0" state the AND-gate 809 will be enabled if there is no inhibit signal present on the Conductor 507. Accordingly, if the Program Controlled Processor 200 is not currently executing an instruction which requires access to the shared Memory 201 or to the Peripheral Access Circuit 120, the gates 809 and 811 will be enabled and the CS flip-flop 810 and the those periods of time in which priority in accessing the Temporary Memory 201 has shifted from the Program Controlled Processor 200 the the Wired Logic Processor 600, the control arrangement of FIGS. 1–10 is termed to be operating in the "FORCE" mode. The arrangement of FIGS. 1–10 is placed in the "FORCE" mode 24 microseconds prior to the end of the minor cycle. This is termed "FORCE TIME" herein.

During those periods of time in which the Wired Logic Processor of FIGS. 6–10 has completed all of its quota work prior to the end of a minor cycle, the WAIT flip-flop 808 is set to its "1" state and the Wired Logic Processor is termed to be operating in the "WAIT" mode. When the Wired Logic Processor 600 is in the "WAIT" mode that Processor will undertake any assigned nonquota work that it may complete.

At "FORCE TIME" three possible situations may exist, as follows: (1) No quota work has been completed prior to "-FORCE TIME"; (2) Some quota work has been completed, however, certain deferrable quota work has not been completed; and (3) All quota work has been completed and the WAIT flip-flop 808 has been set to the "1" state.

NO QUOTA WORK COMPLETED PRIOR TO "FORCE TIME"

Figure 8:
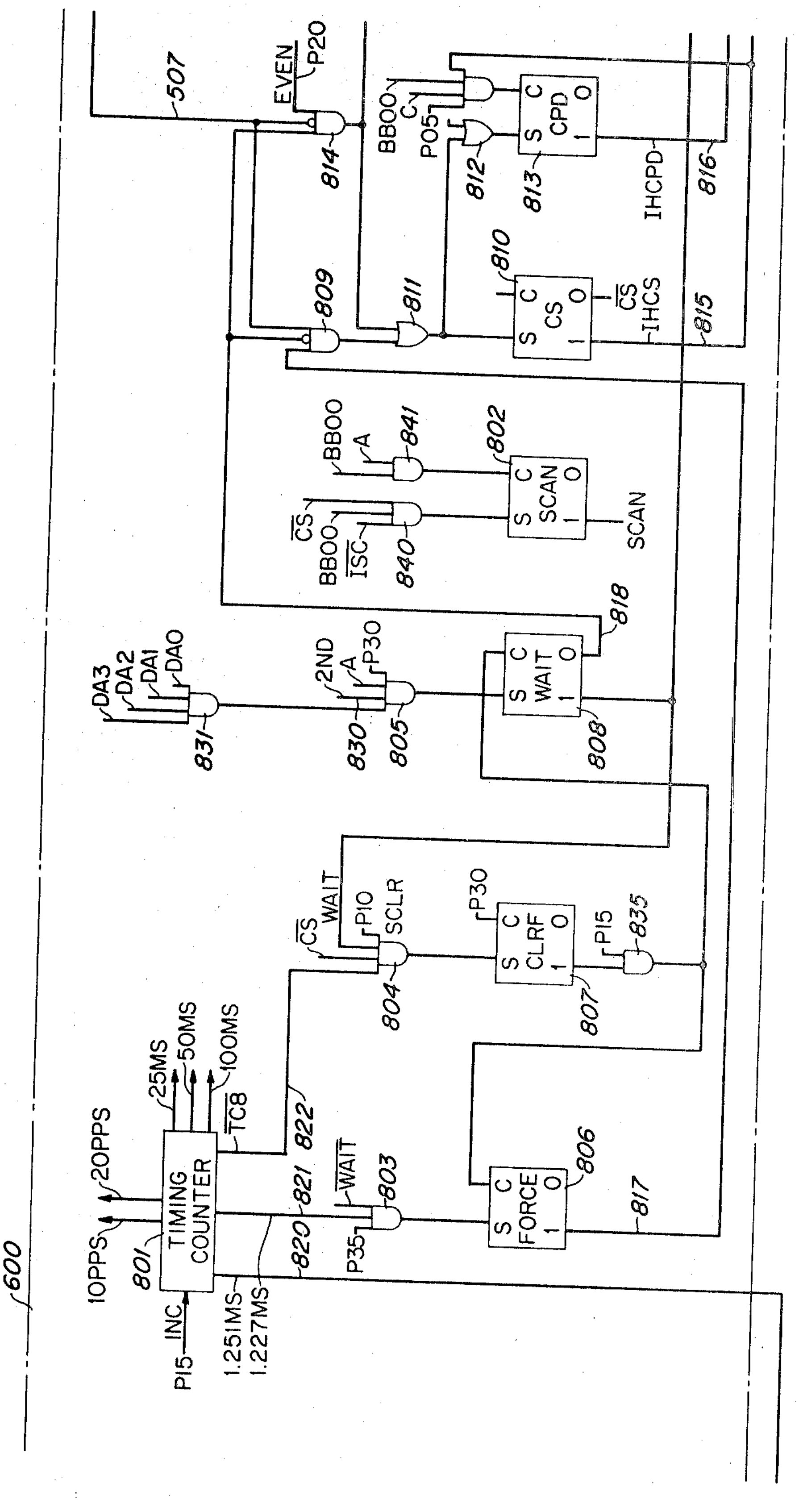
Figure 9:
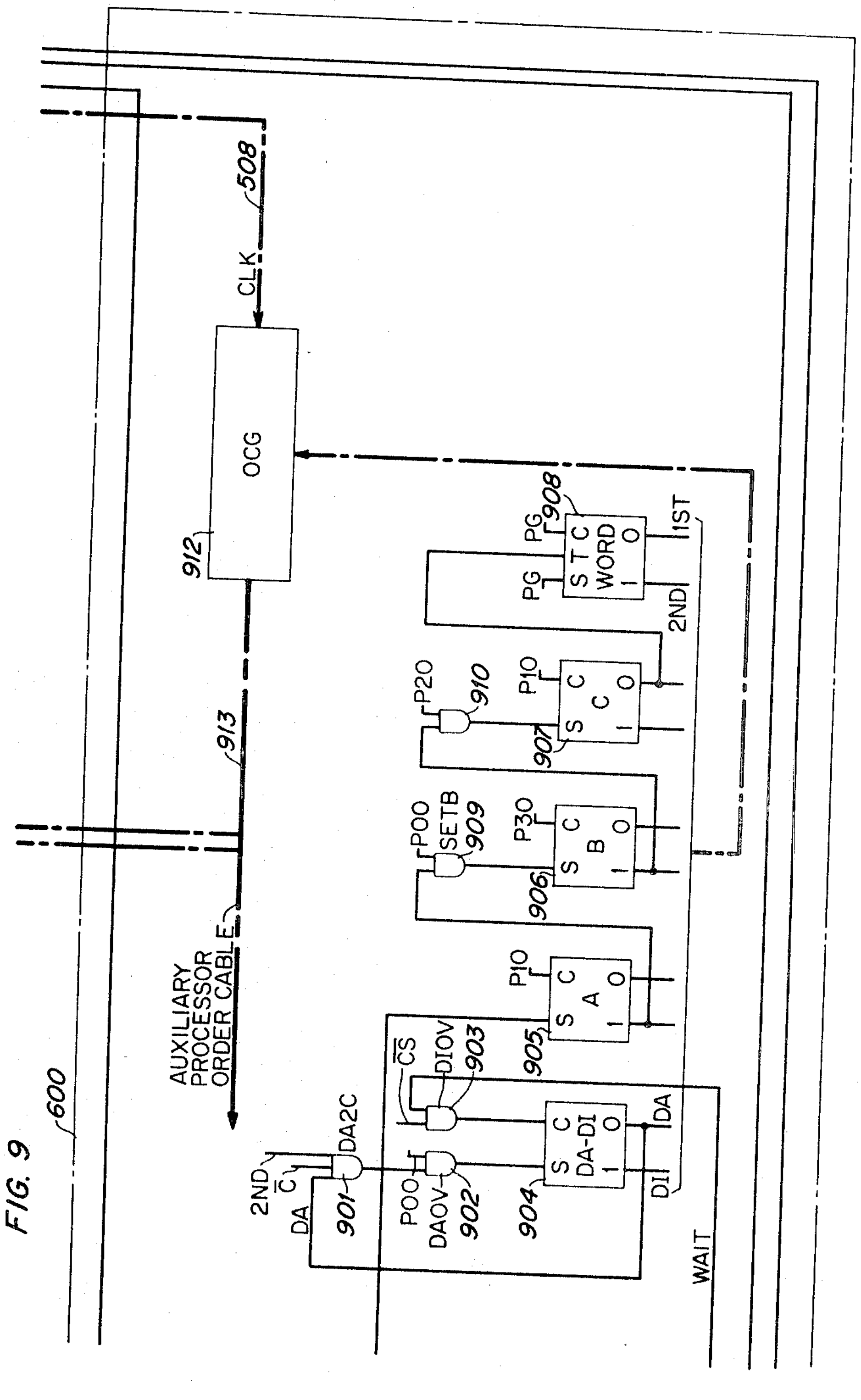

The Timing Counter 801 of FIG. 8 is incremented under the control of a P15 clock pulse which occurs once every 3 microseconds. The counter responds to the trailing edge of the pulse and the count changes at time 25. When the Timing Counter 801 reaches the count of 408, which indicates that 1224 microseconds of a minor cycle have elapsed, the Conductor 821 is enabled. At the end of each 3-microsecond cycle, including the cycle in which the counter reaches the count of 408, the Conductor P35 is enabled. If the Timing Counter 801 has reached the count CPD flip-flop 813 will be set to their "1" states. The output Conductors 815 and 816 of the CS and CPD flip-flops 810 and 813, respectively, when enabled act as inhibiting conductors to the Command Translator 502. A signal on Conductor 815 indicates to the Program-Controlled Processor that the Wired Logic Processor has seized control of the shared Memory 201. A signal on Conductor 816 indicates to the Program Controlled Processor 200 that the Wired Logic Circuit 600 has seized control of the Peripheral Access Circuit 120. Under this condition, the Program-Controlled Processor is free to execute any instructions which do not require the seized circuits, however, in the event that the instruction to be executed requires a circuit which has been seized by the Wired Logic Processor, the Program-Controlled Processor must temporarily halt its operation. During the normal mode of operation, the Wired Logic Processor 600 seizes control of the shared Memory 201 and the Peripheral Access Circuit 120 in 12-microsecond increments. While the two processors are operating in the normal mode, the Program-Controlled Processor will be halted for a maximum of 9 microseconds. However, when the two processors are operating in the FORCE mode the Program-Controlled Processor may be temporarily halted for a maximum of 204 microseconds (12 microseconds for data sending at the end of one minor cycle plus a maximum of 192 microseconds at the beginning of the immediately following minor cycle).

As indicated by the title of this present discussion, it is assumed that no quota work has been completed prior to FORCE time. Accordingly, upon the setting of the FORCE flip-flop 806 Conductor 817 will be enabled to initiate enablement of the AND-gate 809. Since quota work remains to be done the WAIT flip-flop will be in the "0" state, thus placing an enabling signal on Conductor 817 which is a second input to the AND-gate 809. As soon as the Program Controlled Processor 200 signifies, by removing the inhibiting signal on Conductor 507, that it has released the Temporary Memory 201 and the Peripheral Access Circuit 120, AND-gate 809 will become enabled. This, in turn, will enable OR-gate 811 which serves to set the CS flip-flop 810 and the CPD flip-flop 813 to preclude the Stored Program Processor 200 from accessing the Temporary Memory 201 and the Peripheral Access Circuit 120.

Under the assumed conditions the DA-DI flip-flop 904 is in its "0" state, and the DA output conductor thereof is enabled. The output conductors of the DA-DI flip-flop carry control signals which serve to effect data sending and digit operations (originating register servicing for both digit reception and digit transmission), respectively. The A, B, C and WORD flip-flops 905 through 908 comprise a timing chain for controlling the operation of the Auxiliary Processor 600.

The Wired logic Auxiliary Processor 600 attempts to perform one of its assigned quota work tasks every 6 microseconds since at time P20 of each even numbered 3-microsecond cycle there is the possibility of enabling the AND-gate 814 and thus initiating the setting of the A flip-flop 905.

The BA binary counter 704 is employed to store the addresses of the memory word locations at which the serial elements of the data messages are stored. Prior to the transmission of a data message (64 serial bits) the Program Controlled Processor 200 assembles the data messages in the priorly noted address locations 256–383 in the Temporary Memory 201. Further, the Program Controlled Processor 200 sets the six stages of the BA counter 704 to the all "0" state. At the beginning of each 1.251-millisecond minor cycle the stored Program Controlled Processor 200 sets the WORD flip-flop 908 to its "0" state, which serves to enable the output conductor "1st."

A 15-bit address is required to access a location in the Temporary Memory 201. The six least significant bits of the address (bits 0–5) are obtained from the BA counter 704, the contents of which are gated to the CSA register 142 of the Memory Access 140 via AND-gate 706. Bit 6 of the call store address corresponds to the state of the WORD flip-flop 908. When that flip-flop is in the "0" state and its "1st" output conductor is enabled, Bit 0 of the Temporary Memory address will be a "0." When the WORD flip-flop 908 is in the "1" state and the "2nd" output conductor is enabled, bit 6 of the Temporary Memory address will be a "1." Bit 8 of the Temporary Memory address is always set to a "1" during data sending by the enablement of AND-gate 738. The CSA register 142 is reset and data is gated only to the stages thereof which are to be set to their "1" state. Accordingly, the setting of Bit 8 of the address to the "1" state assures a starting address of decimal 256 for the reading of the words of the data messages. Bit 6 follows the state of the WORD flip-flop 908 and thus serves to alternately obtain data words for the "1st" and "2nd"a groups of data sender circuits 0–15 and 16–31, respectively.

Figure 1:
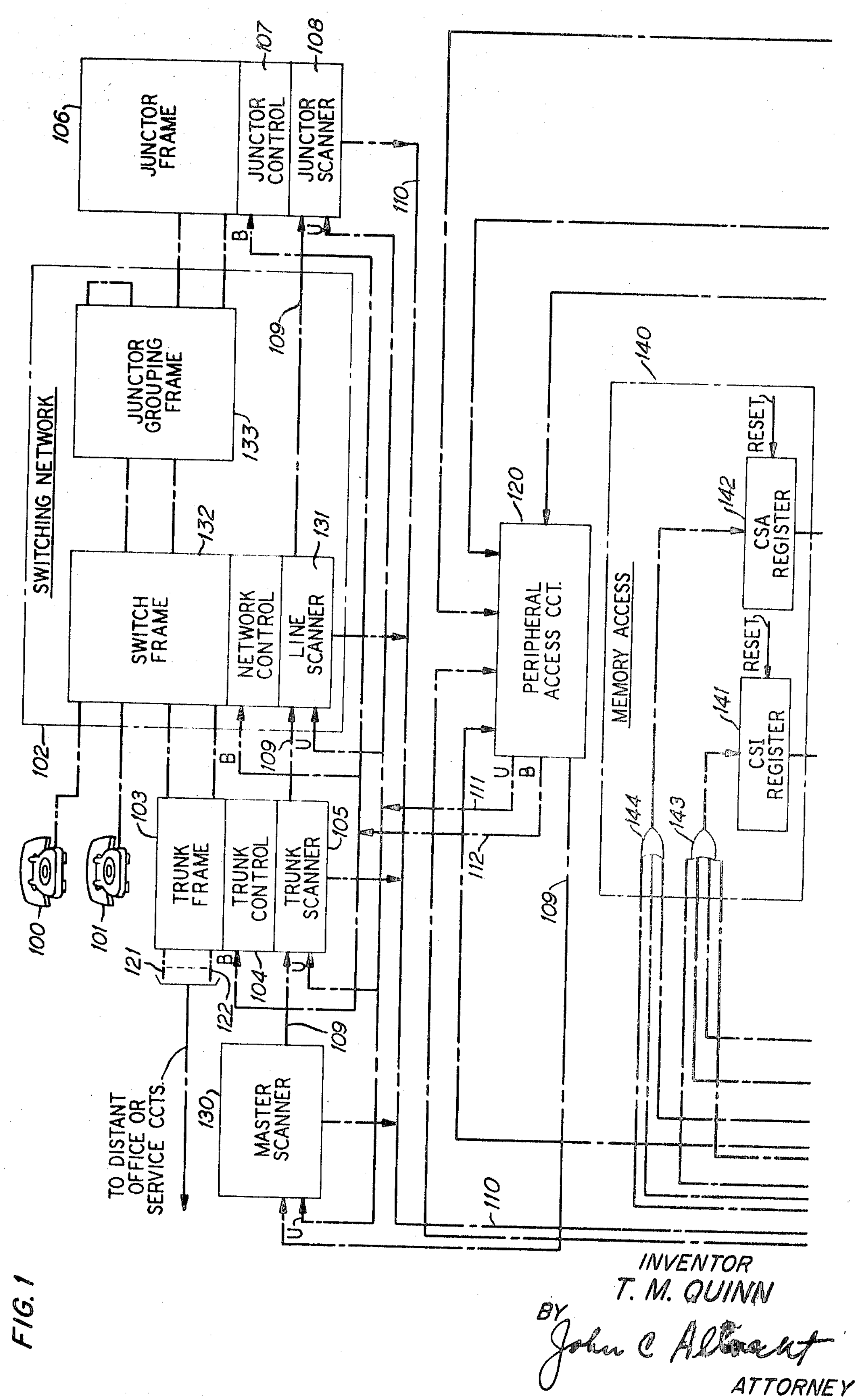

The Memory Access Circuit 140 comprises the Memory Address Register 142 and the Memory Input Register 141. As seen in FIG. 1, both addresses and input data may be transmitted to the Registers 142 and 141 from a plurality of sources. When the auxiliary processor is performing data-sending addresses for accessing the Temporary Memory are obtained from the BA counter 704, the WORD flip-flop 908, and an auxiliary processor order cable signal as set forth above. The gating of information to the Registers 141 and 142 from other sources within the main processor and the auxiliary processor will be described with respect to the various tasks being performed.

As noted earlier herein a 12-microsecond time interval is required for the Auxiliary Processor 600 to perform the work functions with respect to data sending. The first 6 microseconds of that time interval are reserved for the obtaining of the data word for data sender circuits 0–15 from Temporary Memory 201, for gating the information so obtained from the Data Output Register 604 to the data sender circuits 0–15 via AND-gate 620 and for writing the information obtained from the Temporary Memory 201 back into the memory. The reading of information from the Temporary Memory 201 to the DO register 604 occurs during the first 3-microsecond interval and information is returned to the Temporary Memory 201 during the second 3-microsecond period. The second 6-microsecond time interval is similarly employed to obtain a data word for the data sender circuits 16–31 of the Data Sender 1000 and for writing that information back into the Memory 201. Again the first 3-microsecond portion is used in obtaining information from the Temporary Memory 201, placing it in the DO register 604 and for gating this information from the DO register 604 to data sender circuits 16–31 of the Data Sender 1000. The second 3-microsecond time interval is employed in writing the information back into the Temporary Memory 201.

The WORD flip-flop 908 is toggled each time that the C flip-flop 907 is reset. As previously noted, the gate 814 is enabled at P20 time during each even-numbered 3-microsecond machine cycle. Accordingly, the A, B, and C timing flip-flops are cycled once every 6 microseconds. The WORD flip-flop 908 remains in the "1st" state for 6 microseconds and then in the "2nd" state for 6 microseconds.

Figure 19:
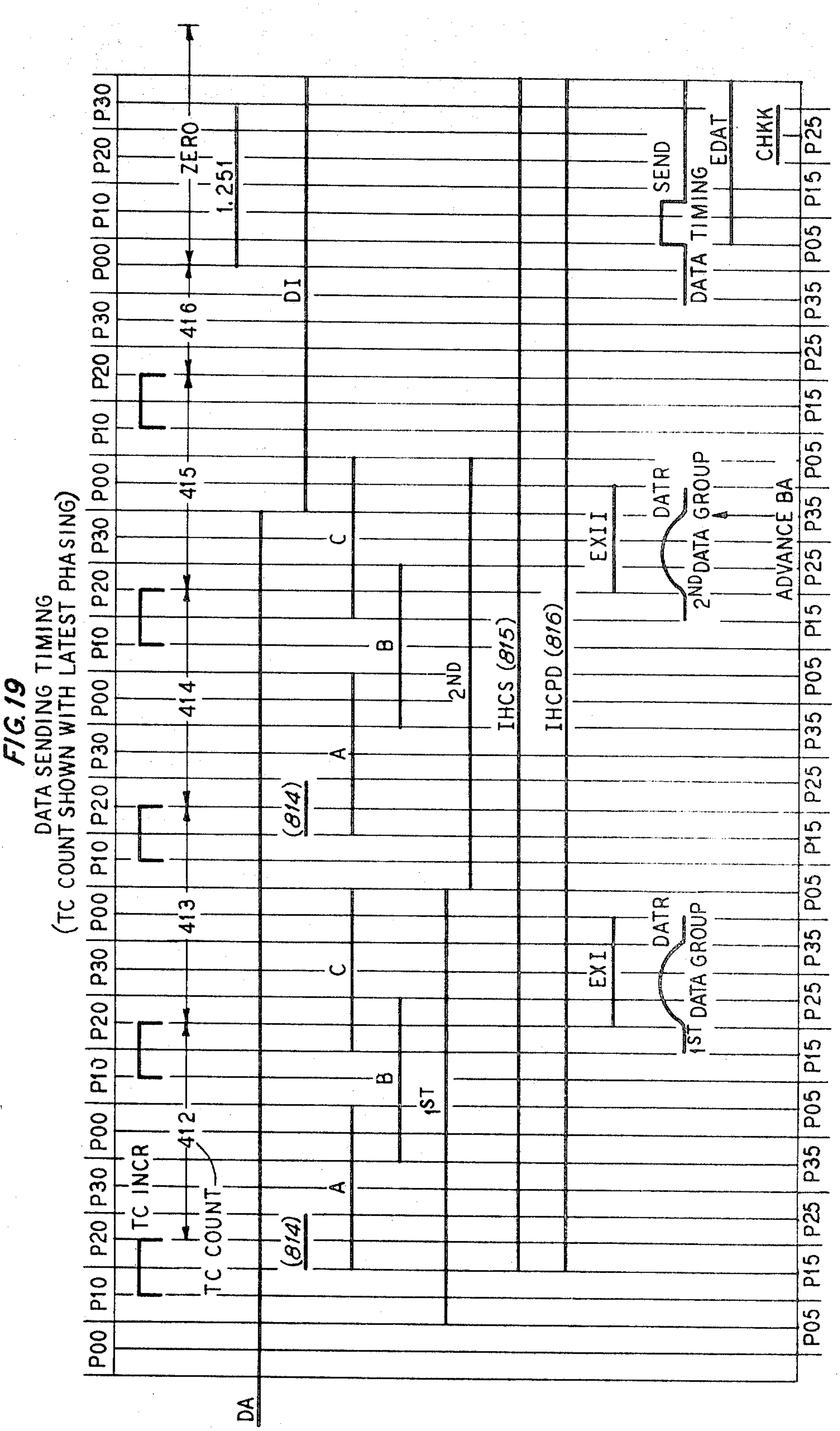
FIG. 19 is a timing diagram showing the states of certain control flip-flops of the Wired Logic Processor 600 during data sending.

FIG. 19 shows the operation of the various timing and control elements discussed above during data sending. In FIG. 19 it is assumed that data sending occurs during the 12-microsecond interval between time 1.236 milliseconds and time 1.248 milliseconds, that is, during the time that the Timing Counter 801 reached the count of 412 through 415. As shown in FIG. 19, the TC-INCR pulses occur at time P15 and the Timing Counter 801 is incremented at the trailing edge of these pulses. The DA output conductor of the DA-DI flip-flop 904 is enabled until the end of the 12-microsecond data-sending time interval. The data-sending operations are initiated by the enablement of the gate 814 at time P20 and the Timing flip-flops 905 through 907 are set and reset as shown. The WORD flip-flop 908 is in the first word state during the first two 3-microsecond cycles and in the second word state during the last two 3-microsecond cycles. The IHCS conductor 815 and the IHCPD conductor 816 are energized at the time the gate 814 is first enabled and they remain energized so long as quota work remains to be performed.

Figure 7:
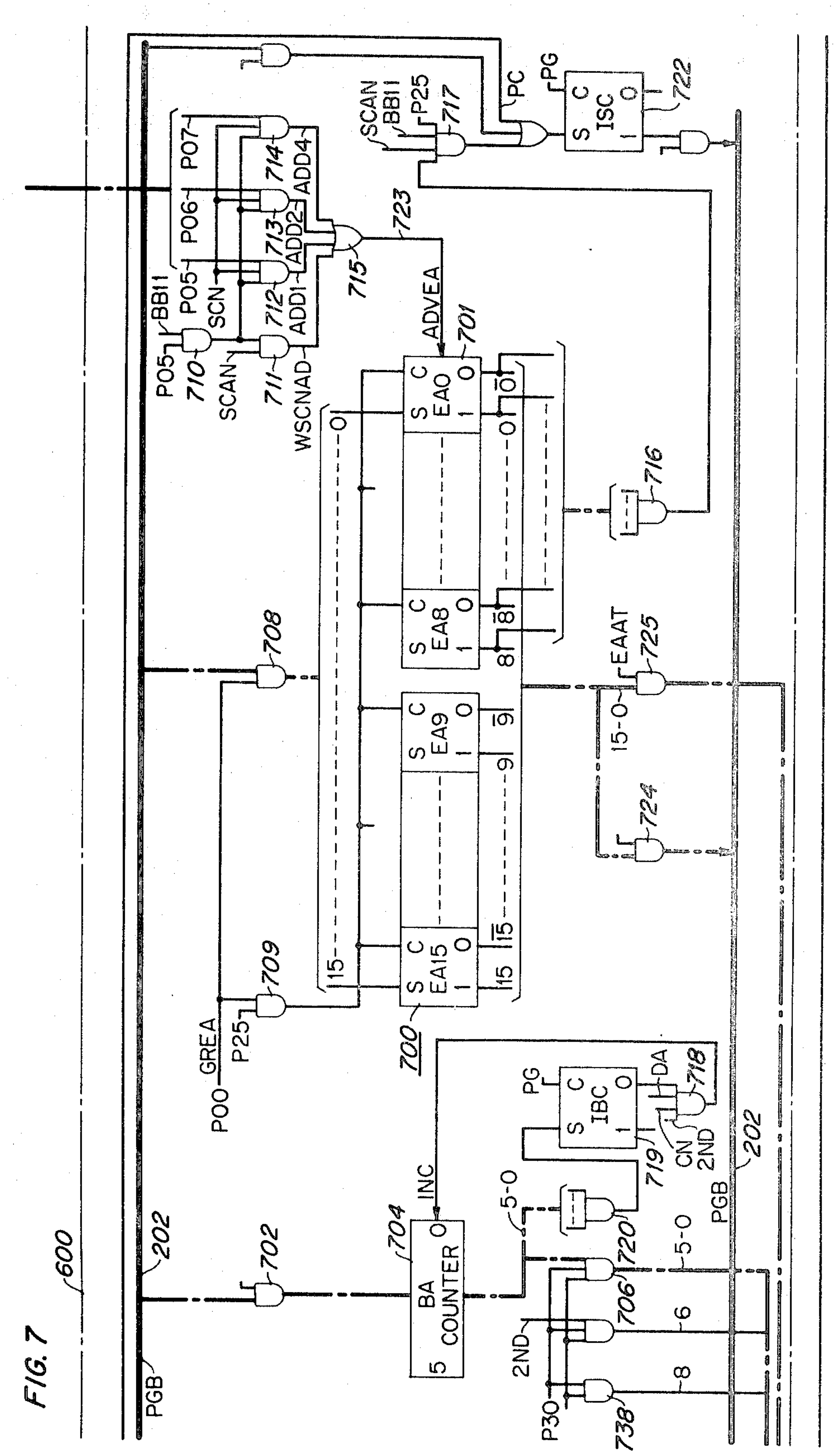

The BA counter 704 comprises six stages and is thus capable of defining 64 states which correspond to bits 1 through 64 of a serial data message. The BA counter 704 is incremented once during each minor cycle in which the count contained therein is other than the maximum count, 63. The BA counter 704 is incremented under the control of an output signal of the AND-gate 718. As shown in FIG. 7, one of the inputs to AND-gate 718 is the "0" output conductor of the IBC flip-flop 719. The IBC flip-flop 719 is set to its "1" state when the AND-gate 720 is enabled. The six input conductors to the AND-gate 720 comprise the "1" output conductors of the stages 0 through 5 of the BA counter 704. Accordingly, the AND-gate 720 is enabled when the BA counter 704 reaches its maximum count of 63. The data in the last word of each group of serial messages comprises all "0's." Since the BA counter 704 is held at the count of 63 (the address of the 64th word of the serial message) the 64th word is transmitted repeatedly via the Data Sender 1000 until such time as the program control places a new set of data messages in the Temporary Memory 201 and resets the IBC flip-flop 719. At the same time, the program control resets the BA counter 704 to the "0" state to initiate data sending with the first word of each group of serial data messages.

As seen in FIG. 19, upon completion of the data-sending work functions, the DA-DI flip-flop 904 is set to its "1" state and thus energizes the DI output conductor. Under the assumed conditions, all 16 originating registers remain to be served. Since the 1.251-millisecond minor cycle has expired, the Wired Logic Processor 600 must retain control of the Temporary Memory 201 and the Peripheral Access Circuit 120 for a full 192 microseconds (12 microseconds for each of the 16 unserved originating registers).

Figure 15:
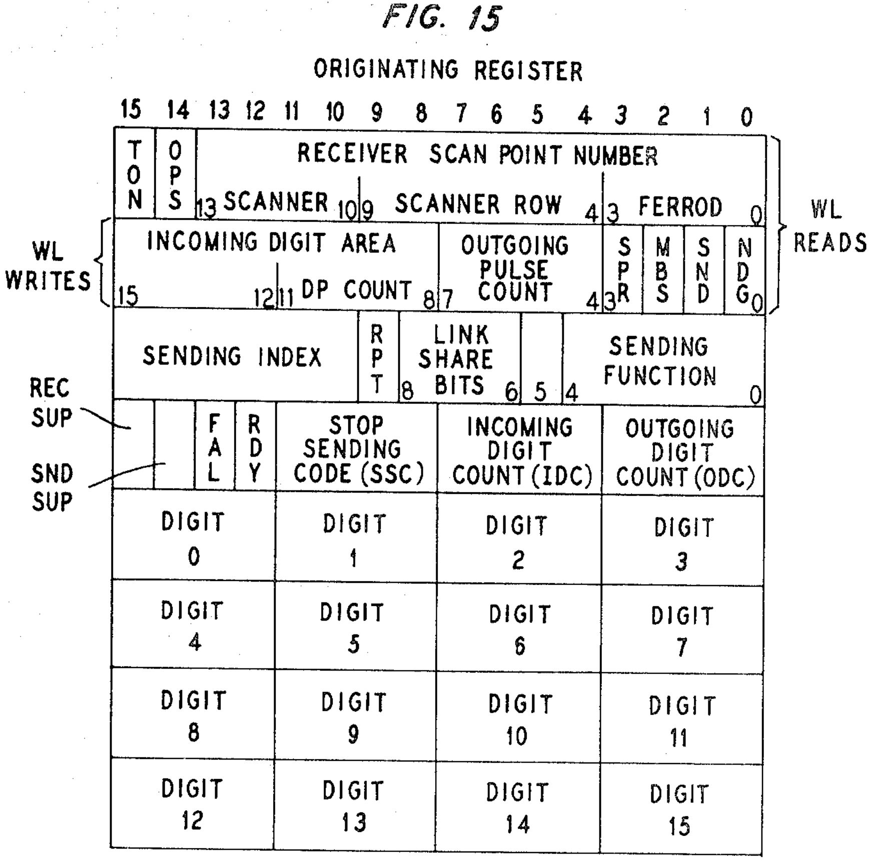
FIG. 15 illustrates the makeup of an originating register (OR)

As previously explained, control information is communicated from the Program Control Processor 200 to the Wired Logic Processor 600 by way of the first word of each originating register. As seen in FIG. 15, an originating register comprises eight successive words in the Temporary Memory 201. The 15 bits of the address for reading the first and second words of each originating register from the Temporary Memory 201 are obtained in the following manner:

1. Bit 10 is set to a "1" by enabling AND-gate 721. Thus the starting address, decimal 1024, of the words which comprise the originating registers is established;
2. Bit 0 is set to a state which corresponds to the state of the WORD flip-flop 908. Thus during the first 6-microsecond period of time, bit 0 is in the "0" state and during the next succeeding 6-microsecond period of time, bit 0 is set to the "1" state. This serves to read the first and second words of an originating register since they occur at adjacent addresses in the Temporary Memory 201;
3. Bits 3 through 9 of the address correspond to the value in stages 0 through 6 of the DA counter 703. A change of one count in the DA counter 703 serves to increment the temporary memory address by a count of 8, thus providing for advancing from the first word of one originating register to the first word of the next originating register. These 7 bits of information in the DA counter 703 are sufficient to define 128 originating registers. Since 16 originating registers are served during each minor cycle the stages "0" through "3" of the DA counter are connected to the AND-gate 831 to detect when the count of 16 is reached. The output conductor of the AND-gate 831 is one of the previously described inputs to the AND-gate 805 which serves to set the WAIT flip-flop 808. 4. The remaining bits 1, 2, and 11 through 14 of the address are always 0. Since the CSA register 142 is reset at the beginning of each memory reading cycle, only those stages which are to be set to their "1" state need receive new information.

The servicing of an originating register requires 12 microseconds of operating time of the Auxiliary Processor 600. During the first 6 microseconds the Temporary Memory 201 is accessed to obtain the first word of the originating register currently serviced. The first word is placed in the DO register 604 and bits 0 through 3, 14 and 15 are gated to stages 1 through 6 of the First Word register 603. Stage 0 of the First Word register serves to indicate that the register served is in the idle state; that is, the contents of the DO register are monitored by the Idle Register Circuit 621 and when the first word indicates that the register is idle stage 0 of the First Word register 603 is set to the "1" state.

As seen in FIG. 15, bits 4 through 13 (10 binary bits) identify the scanner number and the scanner row which is associated with the currently served originating register. Bits 4 through 9 of the DO register define the scanner row, bits 10 through 12 define the scanner and bit 13 defines which of the duplicate scanner controls is to be used. The contents of stages 4 through 13 of the DO register 604 are gated to the Peripheral Access Circuit 120 via AND-gate 622 and Conductor Group 625. As in the case of data sending, the timing of operations within the Auxiliary Processor 600 are under control of the timing flip-flops 905 through 907 and the WORD flip-flop 908. Signals on the Auxiliary Processor of the cable 913 are employed in the control of the Peripheral Access Circuit 120 during originating register servicing. The scanner is addressed during the second 3-microsecond interval of the first 6 microseconds. Also during this second 3-microsecond interval the contents of the DO register 604 are returned to the Temporary Memory 201 via the Write Back Logic 607, Conductor Group 626 and the CSA register 142 of the Memory Access Circuit 140. The first word of the originating register is returned to the Temporary Memory 201. The Wired Logic Processor 600 never alters the contents of the first word since this is the means by which the Program Controlled Processor 200 communicates information to the Wired Logic Processor. At the end of the first 6-microsecond interval the WORD flip-flop 908 is toggled from the first word state to the second word state. Thus the address which is gated to the Memory Access Circuit 140 is the address of the second word of the originating register being served. The contents of the second word are shown in FIG. 15. The second word is obtained during the first 3 microseconds of the second 6-microsecond interval.

Digit reception and digit transmission may be carried out simultaneously during the servicing of the originating register. Accordingly, the contents of the first word need not distinguish between digit reception and digit transmission. Digit transmission is a relatively automatic function and requires little control information. Bit 14 of the first word of the originating register (contained in bit position 5 of the First Word register 603) is in a "0" state during 10-pulse per second outpulsing and in the "1" state during 20-pulse per second outpulsing. Digit reception, however, requires the use of receiving equipments (digit receivers) which correspond to the digit transmission apparatus. Accordingly, the control information in the first word of the originating register must define the type of call-signaling information that is being supervised. Bit 15 of the first word of the originating register differentiates between tone and dial pulse digit reception. When bit 15 is in the "0" state dial pulses are to be expected and when bit 15 is in the "1" state TOUCH-TONE or MF digits are to be expected. Bits 0 through 3 of the originating register (located in bit positions 1 through 4 of the First Word register 603) are coded to identify the dial pulse supervisory ferrod in the group of 16 ferrods which are interrogated by the previously described scanner address. When bit 15 is in the "0" state and indicates that dial pulses are being received any one of the 16 ferrods of the scanner row may be specified by bits 0 through 3 of the first word. When bit 15 indicates that MF or TOUCH-TONE reception is to be expected there is the further possibility that a combined TOUCH-TONE dial pulse subscriber station is being served, therefore, the subscriber's line must be observed for the possible presence of dial pulses. In the case in which TOUCH-TONE is employed, bits 0 through 3 of the first word of the originating register will be set to the value of decimal 1. This specifies that the ferrod in position 1, of the bits positions 0 through 15, carries the dial pulse supervisory information. As will be explained more fully later herein, this is of significance in the details of the Write Back Logic 607.

In the event that MF digits are being received the data in bit positions 0 through 3 of the first word of the originating register are without significance since there is no possibility of receiving dial pulses over the trunk connected to the assigned digit receiver.

Word 2 of the originating register serves to convey information from the Wired Logic Processor 600 to the Program Controlled Processor 200. The Program Controlled Processor 200 writes new information into this word location, however, the Wired Logic Processor 600 does not respond to such information. The Wired Logic Processor merely modifies the information in word 2 to reflect its actions in the servicing of the originating register.

The 16 bits of word 2 of the originating register are employed as follows: Bit 0 is a flag bit which is employed during dial pulse reception. If during dial pulse digit reception a change from on-hook to off-hook is detected the "new digit flag" (NDG) is set to the "0" state and the dial pulse count in bit positions 8 through 11 of the second word of the originating register is incremented by the count of 1. The Program Controlled Processor 200 examines all originating registers once every 125 milliseconds and at that time sets the new digit flag (NDG) to the "1" state. If this flag remains in the "1" state 125 milliseconds later, the Program-Controlled Processor assumes that a new digit is completed or that the line has disconnected. The decision as to whether the digit is complete or the calling subscriber has disconnected is based upon the state of bit 2 of the word 2 of the originating register. Bit 2 contains an indication of the supervisory state (on-hook or off-hook) of the line as determined by the last scan of the line. If bit position 2 is in the "0" state, indicating that the line is in the on-hook state, it is assumed that disconnection has occurred. However, if bit 2 is in the "1" state, indicating an off-hook supervisory condition, it is assumed that a new digit has been completed.

Bit 2 of word 2 (the SND bit) is employed as a flag to the Program Controlled Processor 200 during outpulsing and to indicate receipt of the first digit during the time that dial tone is connected. The Program Controlled Processor 200 sets bits 4–7 of word 2 of the originating register to the all "0" state during the time that dial tone is connected to the calling subscriber served by the originating register. When the first digit has been received, whether that digit be TOUCH-TONE or dial pulse, a signal indicating the presence of a digit or a pulse of a digit and a signal indicating that bits 4–7 of word 2 of the originating register are in the all "0" state, are combined to set the SND flag bit to the "1" state.

Subsequently, when the Program-Controlled Processor finds the SND flag in the "1" state it examines the contents of bits 4–7 of word 2. If these bits are in the all "0" state the Program Controlled Processor takes steps to remove dial tone from the line of the calling subscriber served by the originating register.

When outpulsing is being performed, the Program Controlled Processor 200 sets the count in the bit positions 4–7 of word 2 to a count one larger than the value of the digit to be transmitted. During outpulsing the Wired Logic Processor 600 under the control of bit 14 of the first word of the originating register decrements the count in bits 4–7 once every 50.004 milliseconds for 20-pulse-per-second sending and once every 100.08 milliseconds for 10-pulse-per-second sending.

When the count in the bit positions 4–7 of word 2 reaches the count of one the Wired Logic Processor 600 sets the SND flag to the "1" state. Subsequently, the Program Controlled Processor 200 examines the SND flag and upon finding the count in bit positions 4–7 to be equal to one terminates the transmission of pulses.

During periods of time in which outpulsing is not being performed and dial tone is not connected to the calling subscriber, the count in bit positions 4–7 of word 2 is set to the value fifteen by the Program Controlled Processor.

Figure 12:
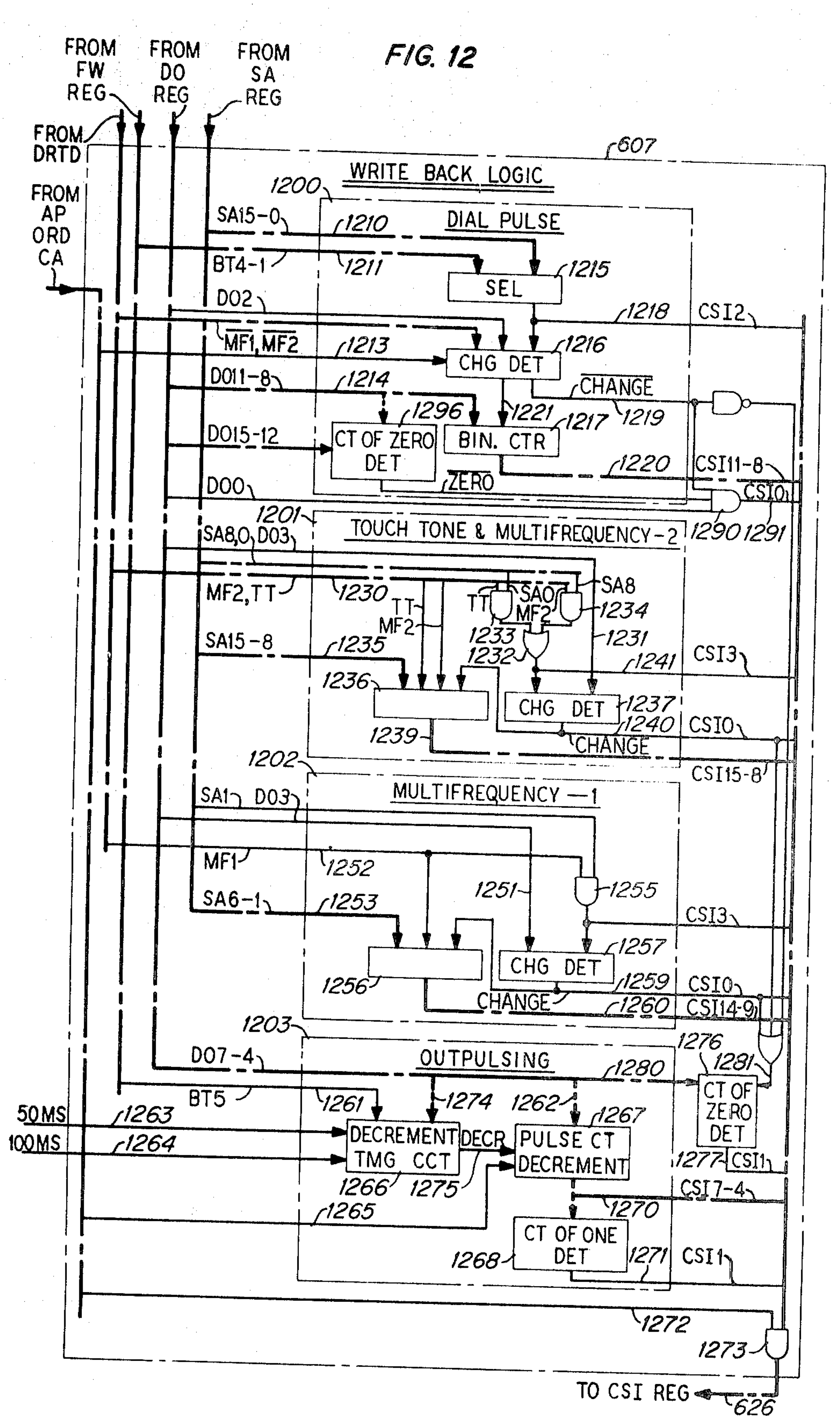
FIG. 12 shows the details of the write back logic of FIG. 6.

The Write Back Logic 607 is shown in partial detail in FIG. 12. At the bottom of FIG. 12 there is shown the outpulsing Write Back Circuitry 1203. The inputs to the Decrement Timing Circuit 1266 comprise: (1) the timing conductors 50MS and 100MS; (2) bit 5 of the First Word register 603 (this corresponds to bit 14 of the first word of the served originating register); and (3) bits 4–7 of the DO register 604. If the count which appears on Conductor Group 1274 has a value other than 0, 1, or 15, the Decrement Timing Circuit will generate an output pulse on the Decrement Conductor 1275 during the time that a signal occurs on the appropriate one of the timing Conductors 1263 or 1264. The signal on Conductor 1261 (bit 5 of the First Word register which corresponds to bit 14 of word 1 of the originating register) chooses between the 50-millisecond and 100-millisecond timing pulses on Conductors 1263 and 1264.

The values 0 and 15 of bits 4–7 of the DO register 604 are reserved to indicate that dial tone is connected to the calling subscriber and to indicate that outpulsing is not being performed, respectively.

The input signals to the Pulse Count Decrement Circuit 1267 comprise bits 4–7 of the DO register 604, the Decrement Conductor 1275 and an auxiliary processor order cable Conductor 1265. The signal on Conductor 1265 is a timing signal which activates the Pulse Count Decrement Circuit 1267 at the appropriate time in the second 6-microsecond interval during which the originating register is being served. The Pulse Count Decrement Circuit 1267 is arranged to decrement the count which appears on Conductor 1262 by a count of one upon the occurrence of a decrement signal on Conductor 1275. The decremented count is transmitted via Conductor Group 1270, AND-gate 1273, and Conductor Group 626 to bits 4–7 of the CSI register 141. In the absence of a decrement signal on Conductor 1275, the Pulse Count Decrement Circuit 1267 passes the count from Conductor Group 1262 to Conductor Group 1270 without alteration.

The Detector Circuit 1268 is employed to set the SND flag bit in bit position one of word 2 of the originating register. The output of the Detector Circuit 1268 is connected to bit position one of the CSI register 141 via Conductor 1271, AND-gate 1273, and Conductor Group 626. The Detector Circuit 1268 serves to set the SND flag bit to indicate to the Program Controlled Processor 200 that the outgoing pulse count in bit positions 4–7 of word 2 has reached the critical count of one and that outpulsing is to be halted.

The Count of Zero Detector Circuit 1276 is employed to set the SND flag to indicate that the first digit has been received from a calling subscriber and that dial tone may be removed from that subscriber's line. The inputs to the Count of Zero Detector Circuit 1276 comprise: (1) the contents of bit positions 4–7 of the DO register 604 and (2) conductor 1281. Conductor 1281 is active whenever one of the Conductors 1291, 1240 and 1259 is active. As will be explained more fully these conductors are active during periods of time in which a digit has not been detected by one of the circuits 1200, 1201 and 1202. The Count of Zero Detector Circuit 1276 generates an output signal on Conductor 1277 when the contents of bit positions DO4-DO7 of the DO register equal "0" and the Conductor 1281 is active.

Figure 6:
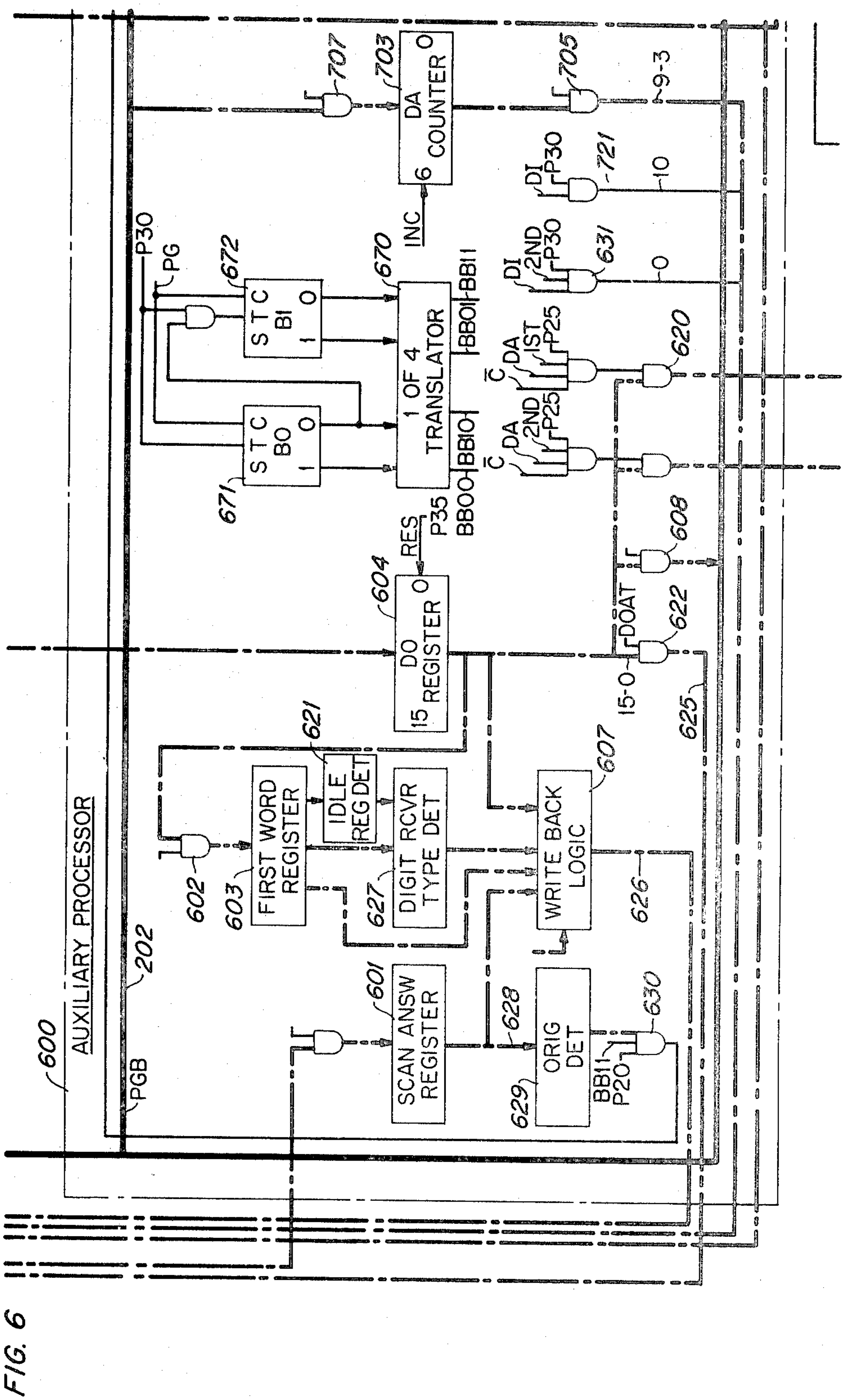
FIGS. 6 through 9 are a schematic diagram of the wired logic auxiliary processor.

The remainder of FIG. 12 shows the Write Back Logic associated with dial pulse, TOUCH-TONE, and multifrequency digit reception. The state of bit 15 of the first word of the originating register (corresponds to bit 6 of the First Word register 603) distinguishes between dial pulse and tone signaling. When bit 15 is in the "0" state the originating register is serving a line which is arranged to generate only dial pulses and is therefore connected to a dial pulse digit receiver. When bit 15 is a "1" the calling line or trunk may be arranged to send dial pulses, TOUCH-TONE signals, or multifrequency signals. Under this condition the served trunk is arranged to transmit multifrequency signals and a line may be arranged to send TOUCH-TONE signals alone or both TOUCH-TONE signals and dial pulse signals. In this latter instance the Wired Logic Processor 600 must respond to both dial pulse and TOUCH-TONE digits and must accurately record digit information. The coding of bits 0–3 and 15 of the framework (found in bits 0–3 and 5 of the First Word register 603) serves to distinguish between a dial pulse line; a TOUCH-TONE line; a trunk employing a multifrequency digit receiver having its receiving ferrods connected to the low seven bits of the scanner answer bus; a trunk employing a multifrequency receiver having its receiving ferrods connected to bit positions 8–15 of the scanner answer bus; and a line employing a combined TOUCH-TONE/dial pulse receiver. Shown in FIG. 6 is a Digit Receiver Type Detector Circuit 627. The Circuit 627 is arranged to examine bits 0–3 and 15 of the originating register (bits 1–5 of the First Word register 603) and to generate output signals which indicate which type of digit receiver circuit is being employed. These conductors are shown in FIG. 12 and comprise the TT Conductor, the MF–1 and $\overline{MF-1}$ Conductors, and the MF–2 and $\overline{MF-2}$ Conductors.

The digit detection circuits 1200, 1201, and 1202 are selectively employed when serving an originating register. In the case of a line served only by dial pulse station apparatus a dial pulse digit receiver is connected to the line at the time a request for service is recognized. The dial pulse ferrods for 16 dial pulse receivers are terminated in a single row of a scanner, e.g., trunk scanner 105. Accordingly, while dial pulse digit detection is being performed the ferrod of the dial pulse receiver assigned to the call must be selected. Bits 0–3 of the first word of the originating register (stored in bits 1–4 of the First Word register 603) appear on Conductor Group 1211 as control signals to the Selector Circuit 1215. The coding of the bits 0–3 serves to select the appropriate one of 16 ferrods whose states appear as signals on the conductors SA0–SA15 of Conductor Group 1210. The selected scanner answer at the output of the Selector 1215 is connected to the Change Detector Circuit 1216 and is employed to update the last look information in bit position "2" of word 2 of the originating register. The signal on conductor 1218, during the second 6-microsecond interval, is gated to the CSI register 141 via AND-gate 1273 and Conductor Group 626.

The input conductors to the Change Detector Circuit 1216 comprise the scanner answer from the Selector Circuit 1215, bit 2 from the DO register 604, timing signals on Conductor 1213, and the control conductors $\overline{MF-1}$ and $\overline{MF-2}$. The Change Detector Circuit is active during digit detection if the coding of the first word of the originating register indicates that the served line is connected to either a dial pulse digit receiver or to a combined TOUCH-TONE/dial pulse receiver. The control conductors $\overline{MF-1}$ and $\overline{MF-2}$ are active during such times.

The signal from bit 2 of the DO register 604 comprises the last look information as determined by the preceding scan of the digit receiver and this information is combined with the scanner answer output selected by the circuit 1215.

If a change from off-hook to on-hook or a change from on-hook to off-hook occurs during dial pulse digit detection, the NDG flag in bit position "0" of word 2 is reset to "0." As previously explained, the CSI register 141 is reset to the all "0" state prior to the time that new information is written therein. Information is transmitted to the CSI register only in the event that a "1" is to be written into a bit position. When no change occurs the NDG flag is set to the "1" state unless the prior NDG bit, which appears in bit position "0" of the DO register, is a "0" or unless the contents of the incoming digit area, bit positions 8–15 of word 2 of the originating register, is equal to "0." As seen in FIG. 12 there are three inputs the the AND-gate 1290. These inputs are: (1) the $\overline{\text{Change}}$ Output Conductor 1219 of the Change Detector Circuit 1216; (2) the zero output conductor of the Count of Zero Detector Circuit 1296; and (3) the contents of bit position of "0" of the DO register.

A change from on-hook to off-hook indicates the receipt of the leading edge of a dial pulse and the Change Detector Circuit 1216 provides an increment signal on Conductor 1221. The dial pulse count which has been accumulated by prior servicing of the originating register is found in bit positions 8–11 of word 2 of the originating register. This information is stored in bit positions 8–11 of the DO register 604. The Binary Counter 1217 acquires the previously accumulated pulse account from the Conductor Group 1214 AND TRANSMITS THAT COUNT UNALTERED OR INCREMENTED BY A COUNT OF ONE TO BIT POSITIONS 8–11 of the CSI register 141. If the Increment Conductor 1221 carries an increment signal the count on Conductor Group 1220 exceeds the count on Conductor Group 1214 by one. Otherwise the counts which occur on the two conductors groups are equal.

In summary, during dial pulse detection the following actions occur: (1) the last look bit (bit MBS of word 2) in bit position "2" of word 2 is updated by a signal on Conduction 1218; (2) the NDG flag (bit 0 of word 2) is set to a "1" or a "0" as set forth above; and (3) a dial pulse count is set in bit positions 8–11 of word 2 and this count reflects the presence or absence of a newly detected on-hook to off-hook transition.

When TOUCH-TONE digit reception is being performed the circuits 1200 and 1201 are both active. A full scanner row is assigned to a single TOUCH-TONE/dial pulse digit receiver. However, only 10 ferrods of the 16 are employed. Bit position "0" monitors the signal present output of the digit receiver and is in the "1" state when the digit receiver has recognized the receipt of a TOUCH-TONE signal. A TOUCH-TONE signal comprises one tone selected from a set of four low-frequency tones and one tone selected from a set of four high-frequency tones. The ferrods associated with the low-frequency tones occur in bit positions 8–11 of the scanner answer word and the ferrods associated with the high-frequency tones appear in bit positions 12–15 of the scanner answer word. The dial pulse supervisory conductor of the digit receiver is connected to the ferrod in bit position "1" of the scanner answer word. It should be noted that during TOUCH-TONE digit reception the coding of bits 0–3 of the first word serve to cause the Selector Circuit 1215 to select bit position "1" of the scanner answer word. Thus the appropriate input is connected to the Change Detector 1216 during TOUCH-TONE reception. The detection of dial pulses from a TOUCH-TONE/dial pulse receiver proceeds in the manner set forth above.

It is assumed that during a call a subscriber will not attempt to send both TOUCH-TONE and dial pulse digits. In TOUCH-TONE digit reception the state of the signal present last look bit (the SPR bit in bit position "3" of word 2) is compared with the state signal on the signal present ferrod (bit "0" of the scanner answer word). If the signal present last look bit indicates that a signal was not present at the immediately preceding scan and a signal is now present, a change is indicated. A signal on the conductor TT, one of the outputs of the Digit Receiver Type Detector Circuit 627, enables AND-gate 1233 to gate bit "0" of the scanner answer to the Change Detector 1237 via OR-gate 1232. The other input to the Change Detector Circuit 1237 is the signal present last look bit from bit position "3" of the DO register 604. The last look bit is updated by transmitting the output of OR-gate 1232 to bit position "3" of the CSI register 141 via Conductor 1241, AND-gate 1273, and Conductor Group 626. The Change Detector 1237 generates output signals on the Change Conductor 1240 upon the detection of a change. The circuit 1236 serves to gate the digit information on bit positions 8–15 of the scanner answer to bit positions 8–15 of the CSI register 141 when a signal occurs on Conductor 1240.

In summary, during TOUCH-TONE/dial pulse digit detection the following actions occur: (1) if dial pulse digits are received service proceeds as set forth above with respect to dial pulse digit reception; (2) the signal present last look bit (bit 3 of word 2) is updated by gating the output of OR-gate 1232 to bit 3 of the CSI register 141; and (3) if a changed is detected by the Change DETECTOR Circuit 1237 the NDG flag bit is set to "1" and the tone information on Conductors 8–15 of the scanner answer are transmitted to bit positions 8–15 of the CSI register 141.

Multifrequency digit reception proceeds generally in the same manner as set forth in the description of TOUCH-TONE digit reception. However, in the case of multifrequency digit receivers, two receivers are served by a 16-bit scanner row. Bit positions 0–6 serve a first multifrequency digit receiver termed "MF–1" and bit positions 8–14 serve the second multifrequency digit receiver termed "MF–2."

Multifrequency signals comprise two active tones out of six possible tones. The six possible tones occur in bit positions 1–6 of the scanner answer in the case of the MF–1 digit receivers and in bit positions 9–14 at the scanner answer in the case of MF–2 digit receivers. The signal present ferrod for the MF–1 digit receiver is in bit position "0" and the signal present ferrod for the MF–2 digit receiver is in bit position "8." In MF signal reception the signal present last look bit in bit 3 of word 2 is updated as in TOUCH-TONE digit reception. Furthermore, upon detection of a change by the circuit 1237 or the circuit 1257, a "1" is placed in the NDG bit of word 2 and the tone information is transmitted through the appropriate circuit 1236 or 1256 to bit positions 9–14 of the CSI register 141.

As previously indicated, digit transmission and digit reception may be carried out simultaneously. This is true for all forms of digit receiver circuitry. In FIG. 15 there are shown storage locations for 15 digits. As digits are collected in the incoming digit area (bit positions 8–15) of word 2 of the originating register, the Program Controlled Processor transfers a completed digit to the appropriate digit location. A record of the appropriate digit location is maintained in bit positions 4–7 of word 4 of the originating register. Digits to be transmitted are transferred by the Program Controlled Processor 200 from the appropriate digit location to the outgoing pulse count area (bit positions 4–7 of word 2). A record of the appropriate outgoing digit is maintained in the outgoing digit count area in bit positions 0–3 of word 4 of the originating register.

Figure 16:
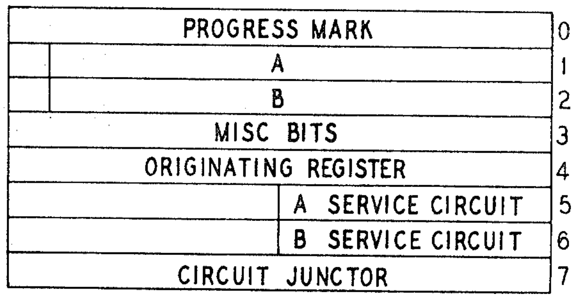
FIG. 16 illustrates the makeup of a transient call register (TCR)

The remaining bit positions of word 4 of the originating register, namely bits 8–15 and word 3 of the originating register are employed to communicate between programs which serve the originating register and programs which serve the transient call record. A transient call record register is shown in FIG. 16. An essential aspect of the transient call register operation is the progress mark word in the first word location. The progress mark is a coded statement of the state that a call has reached. Examples of call progress states are: digit reception with dial tone connected, digit reception dial tone not connected, digit reception completed, busy test, and ringing. A call progress mark word comprises the starting address of the program which is required to serve that call progress mark function. A further discussion of the transient call register is reserved for a later brief discussion of call processing.

Under the earlier assumed conditions none of the quota work was completed prior to "FORCE TIME." Therefore, the servicing of originating registers carried over into the first 192 milliseconds of the next minor cycle. Originating registers servicing proceeds as set forth above and when the DA counter 704 reaches the all "1" state AND-gate 805 will be enabled to, in turn, set the WAIT flip-flop 808 to its "1" state. The "1" output conductor of the WAIT flip-flop 808 is one of the inputs to the AND-gate 804. The remaining inputs to AND-gate 804 are: the $\overline{TC8}$ Conductor 822 of the timing counter 801, the $\overline{CS}$ conductor which is the "0" output conductor of the CS flip-flop 810, and the P10 timing conductor. Upon completion of the 12-microsecond time interval in which the last originating register is served, the CS flip-flop 810 is restored to its "0" state, the enablement of AND-gate 804 serves to set the CLRF flip-flop 807 to its "1" state and immediately thereafter, at P15 time, AND-gate 835 is enabled to clear the FORCE flip-flop 806 and the WAIT flip-flop 808. The Program Controlled Processor 200 may then proceed with the execution of program sequences which require access to shared Temporary Memory 201.

Nonquota work which is assigned to the Wired Logic Processor 600 comprises line scanning to detect requests for service. Line scanning can be performed without waiting for the completion of the quota work. The quota work requires access to the Shared Memory 201 and to the Peripheral Access Circuit 120; however, line scanning requires access only to the Peripheral Access Circuit 120. During times which neither the Program Controlled Processor 200 nor the Wired Logic Processor 600 requires access to the Peripheral Access Circuit 120 line scanning may proceed. Accordingly, even though no quota work is completed prior to "FORCE TIME" it is possible that line scanning has occurred. Line scanning is described later under a separate heading.

SOME QUOTA WORK COMPLETED PRIOR TO "FORCE TIME"

If any quota work has been completed prior to FORCE TIME less than 192 milliseconds of the succeeding minor cycle will be required to complete the quota work. At FORCE TIME the Wired Logic Processor 600 will undertake the servicing of the then unserviced originating registers. Originating register servicing proceeds as set forth earlier herein until such time as the DA counter 703 reaches the all "1" state to set the WAIT flip-flop 808 to its "1" state.

ALL QUOTA WORK COMPLETED PRIOR TO "FORCE TIME"

As previously described herein AND-gate 805 is enabled to set the WAIT flip-flop 808 to its "1" state when all quota work has been completed. Accordingly, at the time that conductor 821 becomes enabled the $\overline{WAIT}$ conductor will not be active and the AND-gate 803 will not become enabled. Thus, although FORCE TIME has passed the FORCE flip-flop 806 will not be set and the Wired Logic Processor 600 will not seize control of the shared Temporary Memory 201 and the Peripheral Access Circuit 120. At the end of the minor cycle the $\overline{TC8}$ conductor 822 will become enabled and with the $\overline{CS}$ conductor, the WAIT conductor, and the P10 conductor active, AND-gate 804 will be enabled to set the CLRF flip-flop 807. As previously described, at P15 time, immediately following the setting of the CLRF flip-flop AND-gate 835 will become enabled to clear the WAIT flip-flop 808 and to provide a clear signal to the FORCE flip-flop 806. Since the FORCE flip-flop was not set the clear signal serves no useful purpose.

LINE SCANNING

The line-scanning arrangement in the Wired Logic Processor 600 is equipped to scan 6,576 lines which terminate on rows of ferrods in 8 line scanners, e.g., scanner 131. Each of the eight scanners contains 64 rows of 16 ferrods each and thus each scanner serves 1,024 lines.

Line scanning is initiated by the setting of the SCAN flip-flop 802 to the "1" state. The inputs to the AND-gate 840 comprise the $\overline{ISC}$ conductor, the BBOO conductor, and the $\overline{CS}$ conductor. The $\overline{ISC}$ conductor is connected to the "0" output terminal of the ISC flip-flop 722. The ISC flip-flop, as will be described later herein, is set to its "1" state when line scanning is to be temporarily terminated. The $\overline{CS}$ conductor is connected to the "0" output terminal of the CS flip-flop 810 which, as previously described, is set to the "1" state during times that the Wired Logic Processor 600 seizes control of the shared Temporary Memory 201. The BBOO conductor is one of the outputs of the Translator 670. The inputs to the Translator 670 comprise the output conductors of the BO and B1 flip-flops 671 and 672. These flip-flops are connected as a two-stage binary counter which is incremented under control of P30 timing pulses. The Translator 670 has four output conductors, namely, BBOO, BB10 BB01 and BB11 which are energized on a mutually exclusive basis in accordance with the states of the B0 and B1 flip-flops 671 and 672. These four conductors, in the order named, serve to define four successive 3-microsecond time intervals.

The B0 and B1 flip-flops 671 and 672 are initialized by signals from the Program Controlled Processor 200 and the SCAN flip-flop 802 is reset by internal signals of the Wired Logic Processor 600.

The EA register comprises two sections, 700 and 701. All stages of this register may be reset under the control of the Program Controlled Processor 200 via the AND-gate 709. Similarly, information may be placed into this register under control of the Program Controlled Processor via the program gating bus 202 and the AND-gate 708. The EA register 700, 701 serves a dual purpose. It is employed by the Wired Logic Processor 600 in performing line scanning and is employed by the Program Controlled Processor 200 to do directed scanning. Bit positions 0–8 of the right portion 701 of the EA register 701 comprise a 9-bit binary counter which is under control of signals on the ADVEA conductor 723. The signals in this conductor serve to increment stages 0–8 selectively by a count of 1, 2, or 4. During line scanning the AND-gates 710 and 711 are enabled to increment stages 0–8 by a count of 1. During directed scanning the gates 712, 713, and 714 are selectively enabled to increment stages 0–8 by a count of 1, 2, or 4, respectively. These gates are controlled by output signals of stages 5, 6, and 7 of the PO register 501 during directed scanning operations.

Prior to the initiation of line scanning the Program Controlled Processor 200 sets stages 0–13 of the EA register to the all "0" state. As line scanning proceeds the count in stages 0–8 is incremented after it has been determined that the scanned row does not include a line in the off-hook state. In the event that the Program Controlled Processor 200 undertakes a directed scan it first gates the contents of the EA register 700, 701 to a memory location in the Temporary Memory 201. The contents of the EA register are moved to the program gating bus via AND-gate 724 and to the CSI register via AND-gate 233.

Bit positions 0–5 (six binary stages) define the current scanner row out of 128 rows. The bits 6–8 define the current one of the eight line scanners 131 and bits 9–15 distinguish the line scanners from the remainder of the peripheral circuits, such as the network control units, the junctor control circuits, etc. The contents of the EA register 700, 701 are gated to the Peripheral Access Circuit 120 via AND-gate 725. The scanner answer is returned to the Wired Logic Processor 600 via the Conductor Group 110. The scanner answer is recorded in the Scanner Answer Register 601. The contents of the Scanner Answer Register 601 are employed in digit detection as described with respect to FIG. 12. In the case of line scanning the Originating Detector Circuit 629 observes the contents of the Scanner Answer Register 601 and in the event that a line is found to be in the off-hook state AND-gate 630 is enabled to set the ISC FLIP-flop 722. On a regular time basis the Program Controlled processor 200 examines the state of the ISC flip-flop 722. If the ISC flip-flop is found to be in the "1" state the Program Controlled Processor 200 will take steps to identify the line requesting service. It should be noted that in the case of lines which are in a stable state or are being served by an originating register the supervisory ferrod of the line is disconnected, thereby precluding further off-hook indications to the line scanning Originating Detector 629. After a subscriber's line has been released the ferrod is connected and subsequent call arrangements can be detected. Line scanning proceeds until one of the following conditions obtains: (1) a line origination has been detected, (2) stages 0–8 of the right portion of the EA register have reached the all "1" count indicating that the last row of the last scanner has been scanned, or (3) until either the Wired Logic Processor 600 or the Program Controlled Processor 200 seizes control of the Peripheral Access Circuit 120.

ALLOCATION OF TIME OF PROGRAM CONTROLLED PROCESSOR 200

Figure 13:
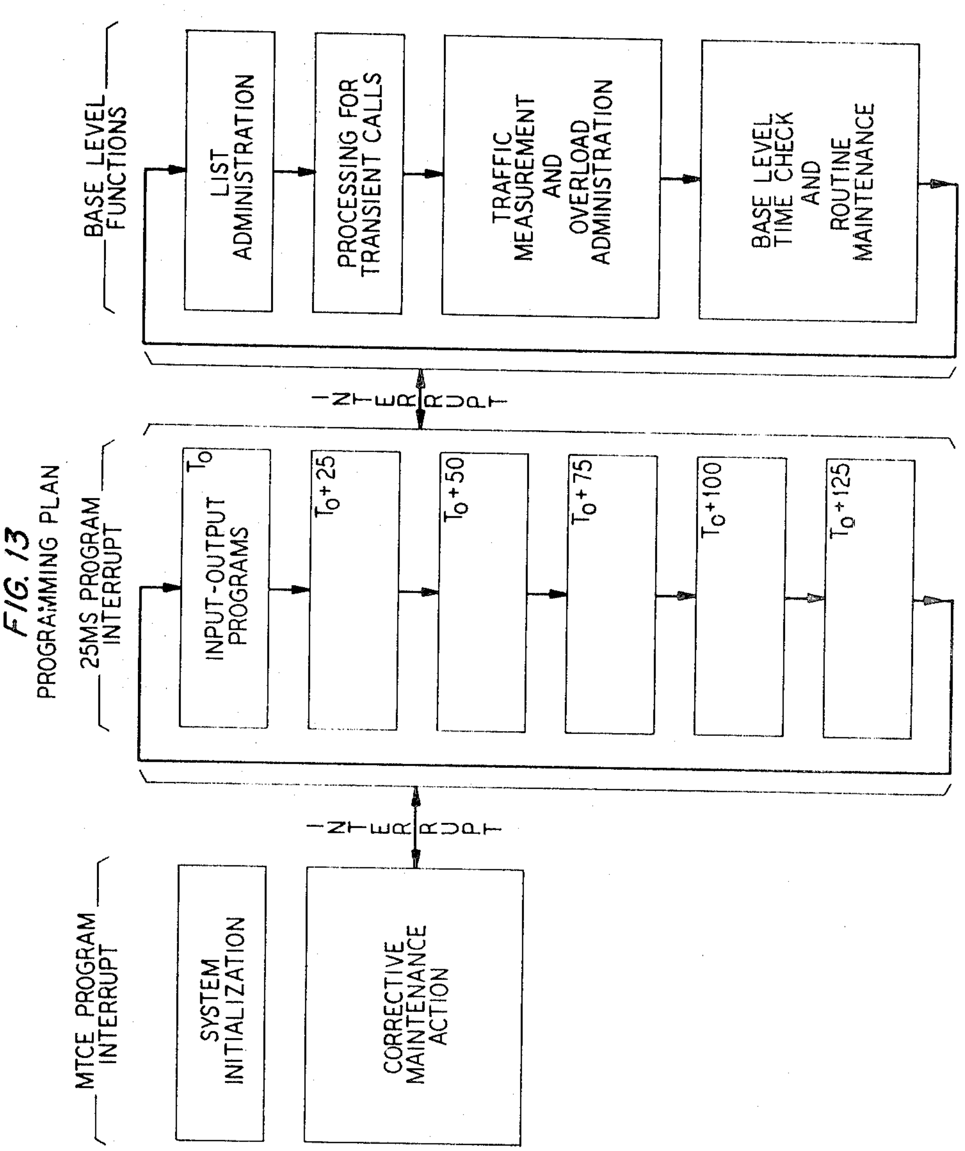
FIG. 13 illustrates the manner in which time is allocated to the various functions of the illustrative switching system.

The programming plan for the Program-Controlled Processor is shown in FIG. 13. This plan includes an interrupt hierarchy for performing call-processing function which must be performed with a fair degree of timing precision and for performing certain corrective maintenance actions. The normal call-processing functions which are performed under interrupt control are performed at a rate of once every 25 milliseconds or at rates which are integrated multiples of 25 milliseconds. Information which is gathered by the timed interrupt program sequences is further processed at the base level which also provides data which is dispatched by the timed interrupt program sequences.

The base level functions vary in execution time since the extent of these functions is highly dependent on system traffic. There is an objective time for completion of execution of all of the base level functions and a maximum time for such execution. Since the time required to perform all of the base level functions varies greatly with traffic conditions, there is a substantial difference between the objective time for execution and the maximum time permitted. In this one illustrative embodiment a record is maintained of the time spent in executing the base level functions, and if that time is less than 100 milliseconds additional maintenance work is introduced into the schedule. For example, routine maintenance functions and data audits may be undertaken to fill the unexpired time. Further, in this illustrative example, if it is determined that the time required for execution of the base level functions has exceeded 325 milliseconds it is assumed that trouble has been encountered and remedial actions are undertaken. Thus, in this one illustrative case an objective minimum time of 100 milliseconds has been established and a maximum time of 325 milliseconds is employed. In the absence of timeout (the passage of 325 milliseconds) all of the work functions to be performed at base level are undertaken before repeating any work in the list.

Base level work may be interrupted by either a timed interrupt program sequence or by a maintenance program interrupt sequence. A timed interrupt program sequence can be interrupted only by a maintenance interrupt program sequence. As previously described, the Wired Logic Input-Output Processor 600 may seize control of the shared Temporary Memory 201 and the Peripheral Access Circuit 120 for periods of time of 9 microseconds to 204 microseconds. This is not considered to be an interrupt within the framework of the program plan of FIG. 13. During times that the Wired Logic Processor seizes control of the shared Memory and the Peripheral Access Circuit, the Program-controlled Processor merely sits idle unless the program sequence can be executed without requiring access to the shared elements.

The specific work functions undertaken during the timed interrupts and the base level functions will be illustrated with respect to call processing.

PROGRAM CONTROLLED PROCESSOR 200

A program memory word comprises 22 bits. The word structure employed herein comprises full word length instructions and half-word length instructions, and each program memory word may contain one full word length or two half-word length instructions. The full word length instructions generally comprise a five-bit operation code accompanied by an address or data, a transfer-allowed bit and, if space permits, a parity bit. Half-word length instructions comprise a five-bit operation code and a five-bit address code. The remaining two bits of the 22-bit memory word are used for the transfer-allowed bit and the parity bit. The five-bit address code of a half-word length instruction is used to denote a value or a modifier. For example, a value associated with a rotate instruction specifies the amount of rotation. A modifier associated with a gating operation specifies the source and destination register combination. The transfer-allowed bit is used to detect illegal transfers and serves to indicate hardware faults as well as program faults. The instructions are loaded in memory subject to the restriction that each full word length instruction be assigned a new memory address location. A half-word length no-operation (NO-OP) instruction is inserted where necessary to adjust the word boundaries such that each full word length instruction will be stored in a new address location.

The operation of logic circuitry within the Program Controlled Processor 200 is generally synchronous and under control of the Clock Circuit 504. As mentioned earlier, this circuit generates clock signals which define a basic 3-microsecond machine cycle. However, the rate at which instructions can be fetched from the Program Store is once every 6 microseconds. The majority of half-word length instructions require one 3-microseconds cycle for execution, so that in many instances two half-word length instructions may be executed during a 6-microsecond memory reading period. In the illustrative system, full word length instructions and certain half-word length instructions require two or more 3-microsecond cycles for execution. The number of cycles required for each instruction ranges from 1 through 6. The fetching of instructions from the Program Memory 300 and the moving of instructions and data within the Program Controlled Processor 200 are discussed herein with reference to FIGS. 2 through 5. There are two flip-flop registers within the Program Controlled Processor 200 which are associated with communications with the Program Memory 300, namely, the 18-bit PA register 304 and the 22-bit PSB register 306. The contents of the PA register 304 define the memory location to be accessed and the PSB register 306 stores instruction words or data obtained from the Program Memory 300 or data to be written into that memory. The PA register 304 is connected to the Program Memory 300 via Cable 307. The PSB register 306 is connected to the Program Memory 300 via cable 326. Instruction words are normally read from the program memory in sequence. Hence the contents of the PA register 304 are normally incremented by "1" prior to the reading of the next instruction. This is done under control of the PA logic 305. Occasionally it is necessary to break the sequential chain and to make a transfer to a nonsequential address. The instruction repertoire includes a variety of transfer instructions which cause a transfer address to be gated into the PA register 304. The transfer address may be obtained from various sources within the Program Controlled Processor 200.

As mentioned earlier, the minimum time interval between successive readings of the Program Memory 300 is 6 microseconds. It is desirable that this entire time be available to execute the instructions read from the memory. For this reason the PO register 501 is provided in addition to the PSB register 306. At a predetermined time of the basic machine cycle the contents of the PSB register 306 are gated to the PO register 501, via AND-gates 510 and 512, for decoding. Thereafter, the contents of the PA register 304 are incremented by "1" and the newly generated memory address is transmitted to the Program Memory 300 to obtain the next instruction in sequence. In case the instruction in the PO register 501 is a transfer instruction, the transfer address rather than the next sequential address must be used in obtaining the next instruction from the Program Memory 300. If the next sequential address has been read, but a transfer is to be executed, the contents of the PSB register 306 will be discarded. When the contents of the PSB register 306 comprise two half-word length instructions, both half-word length instructions are gated into the 22-bit PO register 501. The half-word length instruction stored in the left-hand half of the PO register 501 is always executed first. Upon completion of execution of the left-hand instruction, the contents of the right-hand half of the PO register 501 are gated into the left-hand half of the same register via AND-gate 514. Upon completion of execution of this second half-word length instruction, the next instruction or pair of instructions is gated from the PSB register 306 into the PO register 501.

An instruction in the PO register 501 is decoded by means of the Command Translator 502, which produces output signals unique to the instruction found in the PO register 501. The output signals of the Command Translator 502 are combined in the Order Combining Gate circuit 505 with output signals of the Clock Circuit 504, the Sequence Circuit 506, and the Read and Regenerate Control 503. It is the output signals of the Order Combining Gate Circuit 505 which control the gating actions and logical operations taking place within the Program Controlled Processor 200 and, in certain cases, within the Wired Logic Processor 600.

The Sequence Circuit 506 serves to control the access to the Program Memory 300. Since the various program instructions words require a varying number of 3-microsecond machine cycles for their execution, a circuit must be provided to keep track of the number of cycles yet remaining for execution of a particular instruction in order that new instructions may be obtained from the Program Memory 300 at the correct time. The Sequence Circuit 506 has been provided for this purpose. This circuit is initialized by each instruction and it produces output signals which indicate to the Order Combining Gate Circuit 505 that the next instruction or pair of instructions must be prepared for execution. The Read and Regenerate Control 503 generates timing signals for use by the Order Combining Gate Circuit 505 in the generation of signals required for the reading of data from the Temporary Memory 201, the regeneration of memory cells which have been read, and the writing of data into the Temporary Memory 201. The cooperation of the Program Controlled Processor 200 with the Memory Access 140 will be described later herein.

As shown in FIGS. 2 through 5, the Program Controlled Processor 200 contains a plurality of flip-flop registers. In general, the content of any one register can be gated to any other register in the processor. This transfer of information is accomplished by means of the Program Gating Bus 202 which also extends to the Wired Logic Processor 600 as shown in FIGS. 6 and 7. To transfer data by means of the Program Gating Bus 202 from one register to another, an output gate connected to the source register and an input gate connected to the destination register are both activated. For example, to gate information from the AA register 302 to the CA register 303, AND-gates 315 and 312 are activated. Many of the processor's registers are used primarily for specific functions; however, they are not limited to such use. For example, the AA register 302, the CA register 303, and the GR register 203 are used primarily in communication with the Temporary Memory 201. This communication is via the Memory Access 140. Temporary Memory 201 is responsive to clock signals generated by the Clock Circuit 504 and to read and write signals. There are two read conductors, RCSDO and RCSGR. A signal on the first conductor causes the memory location specified by the contents of the CSA register 142 to be read and the data to be transmitted to the DO register 604 via Conductor 241. A signal on the second conductor causes the memory to be read and the data to be transmitted to the GR register 203 via Conductor 240. There are two WRITE conductors and a signal on either of these conductors causes the contents of the CSI register 141 to be written into the memory location specified by the contents of the CSA register 142. The signals on the RCSDO conductor and one of the WRITE conductors are generated by the Order Combining Gate Circuit 912 in the Wired Logic Processor 600 while signals on the RCSGR conductor and the other WRITE conductor are generated by the Order Combining Gate Circuit 505 in the Program Controlled Processor 200. A 16-bit address may be transmitted from either the AA register 302 or the CA register 303 to the CSA register 142 via the Program Gating Bus 202, AND-gate 231, OR-gate 144, and either AND-gate 315 or 316. Data to be written into the Temporary Memory 201 may be gated to the CSI register 141 from GR register 203 via AND-gate 232 and OR-gate 143, or from other registers by means of the Program Gating Bus 202, AND-gate 233, and OR-gate 143. The Temporary Memory 201 is a destructive readout memory. Any memory location which is read by the processor must be regenerated to preserve the data for subsequent reading operations. The Temporary Memory 201 does not contain flip-flop registers for storing the data to be held for regeneration. Instead, data read from the memory is gated into either the GR register 203 or the DO register 604 and regeneration data is obtained from the CSI register 141. A sufficient period of time is allowed between the reading and regeneration that the read data can be gated to the CSI register 141 from either the GR register 203 or the DO register 604. Certain instructions of the instruction repertoire of the Program Controlled Processor 200 take advantage of this period of time between the reading and regenerating to alter the data which is used for the regeneration. For example, one instruction causes the contents of the memory location specified by the address in the AA register 302 to be read into the GR register 203, causes the contents of the GR register 203 to be logically combined with the contents of the LR register 204, and causes the logical result to be gated to the CSI register 141 before regeneration takes place.

The LR register 204, the LF register 205, the LM register 206, and the LW register 207 are used in conjunction with instructions which perform a variety of logical operations. The Logic Function Circuit 220 is employed by these instructions and generally the contents of the GR register 203 and of the LR register 204 are combined in accordance with the logical function specified by the contents of the LF register 205. The contents of the LM register 206 are used in the logic function to selectively mask certain bits such that the logic function will be performed only on those bits of the input words for which there exists a "1" in the LM register 206, and a "0" will be generated for all bits for which there exists a "0" in the LM register 206. The resultant data word generated by the Logic Function Circuit 220 is gated to the LW register 207 via the Program Gating Bus 202 and AND-gates 234 and 235. If it is desired that the bits on which a logic function has been performed be returned to the GR register 203 but that all other bits of GR register 203 not be disturbed, the Insertion Mask Circuit 208 is employed. This selective insertion into the GR register is accomplished by single rail gating the "1" side of each bit of the LW register 207 to the GR register 203 via the Program Gating Bus 202 and the appropriate AND gates, and simultaneously combining the contents of the LM register 206 and the "0" side of each bit of the LW register 207 and gating the result to the "clear" side of each bit of the GR register 203 via AND-gate 236. As a result, a "1" is written into each bit of the GR register 203 for which there was a "1" in the LW register 207, and a "0" is written in each bit of the GR register for which there exists a "1" in the LM register 206 and a "0" in the LW register 207. It should be remembered that a "1" can appear only in those bits of the LW register 207 for which there was a "1" in the LM register 206. Consequently, a change is made in only those bits of the GR register 203 for which there exists a "1" in the LM register 206.

The Sum Rotate Circuit 301 is a logic circuit which is used for several purposes. This circuit may be used to rotate the contents of any register by a specified amount of gating the contents of the desired register to the Sum Rotate Circuit 301 via the program gating bus, and by gating the rotated result back to the register from which the data originated. The Sum Rotate Circuit 301 is also used to add the contents of the GR register 203 and the AA register 302. The result may then be placed in any desired register. A specified number may also be added to the contents of either the AA or the GR register by means of the Sum Rotate Circuit 301.

It was mentioned earlier that the PA register comprises 18 bits which form an 18-bit address for the Program Memory 300, and that each memory word comprises 22 bits. A 22-bit memory word has space for at most a 16-bit address in addition to the required five-bit instruction code and a check bit. Therefore, a transfer instruction needs two bits in addition to the 16-bit address which is stored in the instruction word. For this purpose, certain bits of the Transfer Buffer 400 have been provided. When a transfer is to take place, two bits are obtained from the Transfer Buffer 400 in addition to the 16-bit address. It is, of course, a prerequisite that the appropriate bits of the transfer buffer be loaded before the transfer instruction is executed. This loading may be accomplished by ordinary data handling instructions. The significance of each of the bits of the Transfer Buffer 400 will not be discussed. The two least significant bits are labeled DFHO and DFH1 and are used by data instructions which read data from or write data into the Program Memory 300. Before such a data reading or writing instruction is executed the bits DFHO and DFH1 must be properly loaded. The address to be employed by the data instruction is constructed by gating contents of an internal register (e.g., AA register 302) into the 16 least significant bits of the PA register 304 and gating DFHO and DFH1 into bits 16 and 17, respectively. Bits 2 and 3 of the Transfer Buffer 400 are designated PFH2 and PFH3 and are used when a transfer is made by means of any number of the transfer instructions of the program. The contents of these two bits are also gated into bits 16 and 17, respectively, of the PA register 304.

Bits 4 and 5 of the Transfer Buffer 400, designated as RAD4 and RAD5, are used to store bits 16 and 17, respectively, of the address in the PA register 304 when data reading or writing of the program memory 300 is stopped and the data address is to be saved. Bits 0 through 15 of the address are stored at a selected location of the Temporary Memory 201 while bits 16 and 17 are stored in RAD4 and RAD5, respectively. When data operations commence at a later time, the data address is reconstructed by obtaining bits 0 through 15 from memory and by obtaining bits 16 and 17 from RAD4 and RAD5, respectively. Similarly, bits 6 and 7 of the Transfer Buffer 400, designated as RAP6 and RAP7, are used to store the two most significant bits of the return address when a transfer is made from a program sequence and the return address is to be saved. As in the case of the data address, the 16 least significant bits are Stored in the Temporary Memory 201 and bits 16 and 17 are stored in RAP6 and RAP7, respectively. Bit 8 of the Transfer Buffer 400 is a flag bit which is set by certain test instructions when a test condition has been met in the Program Controlled Processor 200. For example, the contents of a selected register may be tested for the all "0's" condition by gating the contents onto the Program Gating Bus 202 and by activating the Test Circuit 410. The all "0" Detector 410 which is connected to the Program Gating Bus 202 produces an output which is used to set bit 8 of the Transfer Buffer 400 when the all "0's" condition is detected Bit 9 is not used. Bit 10 of the Transfer Buffer 400 is a flag bit which, when set, indicates that the contents of bits 11 through 15 are to be used by a transfer instruction. The contents of these five bits are used by half word length transfer orders which contain only a five-bit transfer address in their instruction word. The five bits stored in bits 11 through 15 of the Transfer Buffer 400 are gated into bits 5 through 9 of the PA register 304 while the five bits contained in the instruction word are gated into bits 0 through 4 of the PR register 304. For transfer instructions of this type, bits 10 through 17 of the PA register 304 remain unaltered. Consequently, only a limited transfer can be performed under control of such half-word length instruction words.

Execution of a program may be interrupted to begin execution of other programs in response to interrupt signals generated by the Interrupt Register 520. This register comprises a plurality of interrupt flip-flops each of which is assigned a discrete priority level. Interrupt programs are stored in the Program Memory 300 which are uniquely associated with each of the interrupt flip-flops. The Interrupt Register 520 further comprises circuitry for generating interrupt signals which indicate the priority level of the desired interrupt. The Order Combining Gate Circuit 505 is responsive to the interrupt signals to selectively initiate transfers to the interrupt programs in the Program Memory 300. Such transfers are initiated by jamming an interrupt instruction into the PO register 501 upon completion of the instruction being executed. The interrupt instruction stores the contents of the PA register 304 and the Transfer Buffer 400 in predetermined locations of the Temporary Memory 201 and inserts a transfer address into the PA register 304. The value of the transfer address is a function of the level of interrupt being executed. Thereafter the appropriate interrupt program is executed. Interrupt programs are executed in accordance with the priority levels of the interrupt flip-flop associated with the program. Accordingly, higher level interrupts are completed before lower level interrupts are initiated. However, a higher level interrupt may interrupt a lower level interrupt program.

Certain of the flip-flops of the Interrupt Register 520 are set in response to error signals from the Error Detector 521 when errors are detected within the Program Controlled Processor 200. For example, such error signals are generated in case of a parity error in a reading from a Program Memory 300. One of the interrupt flip-flops is set in response to signals on the 25MS conductor. These last-named signals are generated by the Timing Counter 801 in the Wired Logic Processor 600 and occur approximately once every 25 milliseconds. These timed interrupts provide for the initiation of execution of certain programs on a periodic basis.

The instruction repertoire of the illustrative system comprises the following instructions:

Transfer Instructions

| Code | Description |
|---|---|
| TGR | Transfer to address specified by GR register 203 and bits PFH2 and PFH3 of the Transfer Buffer 400. |
| TLR | Transfer to address specified by LR register 204 and bits PFH2 and PFH3 of the Transfer Buffer 400. |
| TR | If bit 10 of the Transfer Buffer 400 is "0,"transfer to address in the PA register 304 modified by five-bit address specified by the instruction; if bit 10 of the Transfer Buffer 400 is "1," transfer to address in the PA register 304 modified by contents of bits 11 through 15 of the Transfer Buffer 400 and the five-bit address specified by the instruction. |
| TRA | Transfer to address specified by the instruction and bits PFH2 and PFH3 of a Transfer Buffer 400. |
| TSA | Store bits 0 through 15 of the PA register 304 in Temporary Memory 201 at address location specified by contents of CA register 303, store bits 16 and 17 of the PA register 304 in bits RAP6 and RAP7 of the Transfer Buffer 400, and transfer to address specified by the instruction and the contents of bits PFH2 and PFH3 of the Transfer Buffer 400. |
| TTSA | Fetch contents of the location of Temporary Memory 201 defined by CA register 303 and insert into bits 0 through 15 of PA register 304, place the contents of bits RAP6 and RAP7 into bits PFH2 and PFH3 of the Transfer Buffer 400 and into bits 16 and 17 of the PA register 304, and transfer to new address in the PA register 304. |
| PIB($n$) | Begin program interrupt: store contents of Transfer Buffer 400 and bits 0 through 15 of PA register 304 at predetermined locations of Temporary Memory 201, store contents of bits 16 and 17 of PA register 304 in bits RAP6 and RAP7 of Transfer Buffer 400, transfer to predetermined wired address modified by $n$ ($n$=1 through 7). The value of $n$ determines the three least significant bits of the address |
| PIE($n$) | End program interrupt: restore Transfer Buffer 400 with information from predetermined address of Temporary Memory 201, restore PA register 304 with information from predetermined address of Temporary Memory 201 and contents of bits RAP6 and RAP7 of the Transfer Buffer 400, and transfer to new address in the PA register 304. |
| TCNS | If bit CF8 of the Transfer Buffer 400 is "0,"transfer as described for TR instruction; if bit CF8 is "1," advance to next sequential address. |
| TCS | If bit CF8 of the Transfer Buffer 400 is "1,"transfer as described for TR instruction; if bit CF8 is "0," advance to next sequential address. |

Test Instructions

| Code | Description |
|---|---|
| 41ST, 4ZT | These two instructions test the lower four bits of the GR register 203 for the all "1's" and all "0's" condition, respectively, and set bit CF8 of the Transfer Buffer 400 if the condition is met. |
| GZT | Test GR register 203 for all "0's" condition and set bit CF8 if condition is met. |
| WZT | Test LW register 207 for all "0's" condition and set bit CF8 if condition is met. |
| MST | This instruction reads a plurality of locations of the Temporary Memory 201 in sequence, combines the read information with the contents of the LR register 204 as specified by LF register 205 and LM register 206, places the result in the LW register 207, and performs an all "0" test on the contents of the LW register. If the desired result is not found, the instruction modifies the read information, writes it into the location from which it was read, reads the next sequential word from the Temporary Memory 201, and performs the same logical operations. Options of the instruction specify whether the desired condition is the all "0" condition or the not all "0" condition of the LW register 207. The number of locations to be so examined is specified by the count |

in the KR counter 522. This count is decremented each time a word is read from memory and the program advances when the count of "1" is reached.

Add Instructions

| Code | Description |
|---|---|
| ADXAA | Add $X$ to the AA register 302 ($X = 1, 4, 8$). |
| ADXCA | Add $X$ to the CA register 303 ($X = 1, 4, 8$). |
| AD1GR | Add "1" to GR register 203. |
| ADD | Add GR register 203 to contents of AA register 302 and place sum in AA register. |

Zero and Set Instructions

| Code | Description |
|---|---|
| SCA2 | Set bit 2 of CA register 303. |
| SCF | Set bit CF8 of Transfer Buffer 400. |
| SGL | Set bit 0 of GR register 203. |
| ZAA | Zero AA register 302. |
| ZAA2 | Zero bit 2 of AA register 302. |
| ZCA | Zero CA register 303. |
| ZA2 | Zero bit 2 of CA register 303. |
| ZCF | Zero bit CF8 of Transfer Buffer 400. |
| ZDFH | Zero bits DFHO and DFHI of Transfer Buffer 400. |

Logic Function Instructions

| Code | Descriptions |
|---|---|
| DLF | Logically combine GR register 203 with LR register 204 as specified by LF register 205 and LM register 206, place result in LW register 207, perform all "0" test on LW register 207 and set bit CF8 of Transfer Buffer 400 if the all "0" condition is found. Besides being gated to the LW register 207 the result may optionally be insertion masked into the GR register 203 as previously explained in this description. |
| AND | Logical AND of GR register 203 and the data word accompanying the instruction. |
| OR | Logical OR of GR register 203 and data word specified by instruction. |
| GTLR2 | Set bit 0 of LR register 204 if bit 0 of GR register 203 equals "0," set bit 1 of LR register 204 if bit 0 of GR register 203 equals "1," and rotate LR register 204 right by two bits. |
| GTLR4 | Set the bit of the LR register 204 identified by the binary code in bits 0 and 1 of the GR register 203, and rotate LR register 204 right by four bits. |
| RGR | Rotate GR register 203 right by the number specified by the instruction. |
| RLRX | Rotate LR register 204 right by $X$ ($X = 1, 2, 4$). |
| VA($n$) | Vary logically the word in the Temporary Memory 201 at the address specified by AA register 302 and modified by $n$. The value of $n$ may be 0, 1, 2, or 3, in which case the two least significant bits of the AA register 302 are given the value of $n$; $n$ may further represent +1, +4, +8, in which case the specified value is added to the existing contents of the AA register 302. The information obtained from the memory address specified by the modified contents of the AA register 302 is gated to GR register 203, logically combined with LR register 204. The result is gated to the LW register 207, is insertion masked into the CSI register 141 via the Insertion Mask Circuit 209 and is written into memory at the location from which it was read. |
| VC($n$) | This information is like VA($n$) except that the CA register 303 is used instead of AA register 302. |

Read and Write Instructions

| Code | Description |
|---|---|
| DATA | Read data from the Program Memory 300. This instruction saves the contents of the PA register 304 and gates a data address into the PA register 304 from the AA register 302 and bits DFHO and DFHL of the Transfer Buffer 400. Upon receipt of the 22-bit data word into the PSB register 306, bits 0 through 15 of this register are gated to the GR register 203 and bits 6 through 21 are gated into the LW register 207. Thereafter the return address is restored to the PA register 304. |
| RAL($n$) | Read data to GR register 203 from the location of the Temporary Memory 201 specified by AA register 302 modified by $n$ [(as explained for instruction VA($n$)]; logically combine contents of GR register 203 and LR register 204, place result in the LW register 207 and set bit CF8 if the LW register 207 contains all "0." |
| RCL($n$) | Like RAL($n$) except that CA register 303 is used in place of AA register 302. |
| RDA($n$) | Read into GR register 203 from the location of Temporary Memory 201 specified by AA register 302 modified by $n$(as previously explained). |
| RDC($n$) | Like RDA($n$) except that CA register 303 is used instead of AA register 302. |
| RED | Read into GR register 203 from location of Temporary Memory 201 specified by the address accompanying the instruction. |
| WPS | Write into Program Memory 300. This instruction saves the contents of the PA register 304 as a return address, obtains a new address from the AA register 302 and bits DFHO and DFHL of the Transfer Buffer 400 and places this address in the PA register 304. Bits 0 through 15 of the GR register 203 are gated into bits 0 through 15 of the PSB register 306 and bits 10 through 15 of the LW register 207 are gated into bits 16 through 21 of the PSB register 306. After the contents of PSB register 306 are written into memory, the instruction restores the return address to the PA register 304. |
| WRI | Write contents of GR register 203 into Temporary Memory 201 at the location specified by CA register 303. |
| WRA($n$) | Write GR register 203 into Temporary Memory 201 at location specified by AA register 302 modified by $n$ (as explained earlier). |
| WRC($n$) | Like WRA($n$) except that CA register 303 is used instead of AA register 302. |

Register-to-Register Gating

| Code | Description |
|---|---|

| | |
|---|---|
| AAX(n) | Gate AA register 302 to register n (n=GR register 203, LR register 204, CA register 303). |
| CAX(n) | Gate CA register 303 to register n(n=GR register 203, LR register 204, AA register 302). |
| EAXGR | Gate EA register 700 to GR register 203. |
| GRX(n) | Gate GR register 203 to register n (n=LR register 204, LF register 205, LM register 206, AA register 302, CA register 303, KR counter 552, EA register 700). |
| GRXXLW | Exchange contents of GR register 203 with contents of LW register 207. |
| FIL | Gate five-bit data word accompanying the instruction into bits 11 through 15, and set bit 10, of the Transfer Buffer 400. |
| FILH | Gate two bits of the data word accompanying the instruction into bits PFH2 and PFH3 of the Transfer Buffer 400. |
| LFYGR | Gate LF register 205 to GR register 203. |
| LGR | Gate data word accompanying the instruction into GR register 203. |
| LLM | Gate data word accompanying the instruction into LM register 206. |
| LLR | Gate data word accompanying the instruction into LR register 204. |
| LMXGR | Gate LM register 206 to GR register 203. |
| LRX(n) | Gate LR register 204 to register (n (n=GR register 203, AA register 302, CA register 303, KR counter 522). |
| LWX(n) | Gate LW register 207 to register n (n=GR register 203, LR register 204). |
| SAXGR | Gate Scanner Answer Register 601 to GR register 203. |
| TBXGR | Gate Transfer Buffer 400 to GR register 203. |
| TCXGR | Gate Timing Counter 801 to GR register 203. |
| VIC | Gate ISC flip-flop 722 to bit 0 of GR register 203, logically combine GR register 203 with LR register 204 and gate bit 0 of the result to ISC flip-flop 722. |

Wired Processor Interface Instructions

| Code | Description |
|---|---|
| XTNWO | External network order: gate GR register 203, LR register 204, and bits 0 through 5 of EA register 700 to Peripheral Access Circuit 120. |
| XTSCO | External scanner order: gate the scanner address stored in EA register 700 to Peripheral Access Circuit 120 (the resulting scanner answer is received in the LR register 204). |
| XTSC(n) | This instruction reads into the GR register 203 the scanner last-look word from the location of Temporary Memory 201 specified by the address in the CA register 303 and transmits the scanner address stored in the EA register 700 to the Peripheral Access Circuit 120. The instruction performs logical operations on the resulting scanner answer received in the LR register 204 and the last-look word stored in the GR register 203, and performs a "0" test on the logical result. If the all "0" condition is met, the address in the CA register 303 is incremented by 1; the next sequential last-look word is read from the Temporary Memory 201 into GR register 203; the contents of the EA register 700 are incremented by the value of n (n=1, 2, 4) and transmitted to the Peripheral Access Circuit 120; the new scanner answer is combined with the last-look word and the "0" test is again performed. This instruction repeats the above-described operations until either a nonzero result is found or the count in the KR counter 522 equals 1. When either of these conditions is encountered, the program advances to the next instruction. The KR counter 522 is loaded by program before the present instruction is executed. This counter is decremented by the present instruction each time a scanner answer is received. |

Miscellaneous

| Code | Description |
|---|---|
| NOP | No operation. This instruction when executed causes no significant changes in any part of the program-controlled processor or its environment. |

CALL PROCESSING

Requests for service may originate with either a line, e.g., 100, 101, or with a trunk, e.g., 103, 104. An intraoffice call between two lines, e.g., 100, 101, is completed through the Switching Network 102 and includes stages of the Switch Frame 132, connections on the Junctor Group Frame 133, and a junctor circuit of the Junctor Frame 106. The junctor circuit is employed to provide talking battery to the connected lines and to provide a point of supervision for add-on, disconnect, etc.

An interoffice call between a subscriber's line, e.g., 100, 101, and a trunk of the Trunk Frame 103, is established through the Switching Network 102 and includes stages of the switch Frame 132, terminals of the Junctor Group Frame 133, and wire junctors. Wire junctors are direct connections and do not include any circuit elements. In the case of an interoffice call talking battery is provided by the trunk circuit and supervision on such calls is performed at the trunk circuits.

Requests for service from subscriber lines 100, 101 are first detected by the Wired Logic Auxiliary Processor 600 while requests for service from trunk circuits are detected by the Program Controlled Processor 200. As previously described, the Wired Logic Processor includes the ISC flip-flop 722 which is set to its "1" state when a possible request for service has been detected. Examination of the ISC flip-flop is one of the functions which is performed during each 25-millisecond timed interrupt. For purposes of discussion this function is performed by a program termed the "Line Scan Program Sequence." If this sequence finds the ISC flip-flop set to its "1" state it makes an entry in a work list termed a "hit-timing list." The entry comprises the identity of the scanner row in which the possible request for service has been detected. The identity information is obtained from the EA register 700, 701. In telephone switching system terminology a "hit" is a transient condition which occurs on a line, and although this transient condition is indicative of a subscriber's set being in the off-hook supervisory state it is not intended as a request for originating service. For example, a subscriber may accidentally jiggle the hookswitch or noise may be introduced into a subscriber's line by a surge of lightning. The hit-timing list serves to request a subsequent scan of the lines from which an apparent request for service is indicated. The subsequent scan is performed 50–75 milliseconds after the line has been placed on the hit timing list. If, at the end of that time, a line of the canner row is found to be in the off-hook state a verified request for service is indicated. The subsequent scanning of the lines in the hit-timing list is performed by one of the 25-millisecond timed interrupt program sequences. If a verified request for service is indicated the interrupt program sequence records the identity of the scanner row into another work list termed a "line origination hopper."

The line origination hopper comprises a plurality of entries which must be served as a base level function. A base level program sequence takes the line origination information from the line origination hopper and chooses a Transient Call Register such as is shown in FIG. 16. An initial progress mark is placed in word 0 of the assigned Transient Call Register (TCR) and the identity of the calling line is placed in position A or word 1 of the register. Subsequently another base level program sequence examines all Transient Call Registers in sequence. If the progress mark recorded in a register indicates that an originating register and a digit receiver have not yet been assigned to the call, steps will be undertaken to assign and connect an appropriate digit section receiver and to assign an originating register (see FIG. 15) to the call origination. There is a Terminal Memory Record which comprises two data words in the Temporary Memory 201 and which is associated with the assigned digit detection receiver. There is a fixed assignment of terminal memory records for each trunk, service circuit, and junctor circuit of the office.

While a call is in the process of being established or released it is termed to be in a "transient state." During such time the Terminal Memory Record (see FIG. 17) includes an entry termed a "TCR pointer." The TCR pointer is the memory address of the assigned Transient Call Register. Word 4 of the Transient Call Register is the memory address of the assigned originating register. Consequently, the base level programs which process the Transient Call Registers have direct reference to the originating register currently associated with the transient Call Register. Similarly, any program which examines a Terminal Memory Record of a trunk circuit, service circuit, or junctor circuit in the transient state finds a direct reference to the Transient Call Register currently assigned.

As previously explained, the Wired Logic Processor 600 collects digits and indicates new digit information in the incoming digit area in word 2 of the originating register. The Program Controlled Processor, by means of one of the 25-millisecond interrupt program sequences, sets the NDG (new digit) bit of each originating register to the "1" state once e very 125 milliseconds to perform dial pulse interdigital timing. Upon detection of a change in state by the dial pulse receiver the NDG flag bit is placed in the "0" state by the Wired Logic Processor 600. Additionally, as previously explained, the Wired Logic Processor will set the SND flag to the "1" state if the outgoing pulse count in bit positions 4–7 is equal to all "0' s" and at least the first pulse of the first digit of a calling sequence has been received.

Once every 50 milliseconds (during selected ones of the 25-millisecond interrupt periods) the Program Controlled Processor 200 examines the SND and NDG flags of each originating register for an indication that work is to be performed. At these 50-millisecond periods the Program Controlled Processor performs work operations with respect to TOUCH-TONE station signals and MF signals. At the times at which the 50-millisecond periods do not correspond to service at 125-millisecond intervals, the NDG flag is ignored if subsequent examination of the contents of the originating register indicates that dial pulses are being received. When the NDG flag is found to be in the "1" state the 50-millisecond program examines the contents of bit positions 12–15 of word 2 of the originating register. In the case of the reception of dial pulses and certain MF signals, the contents of bits 12–15 will be "0." However, in the case of reception of signals from TOUCH-TONE stations and other MF signals, the contents of bit positions 12–15 will be other than "0." An examination of bits 0–3 and 15 of the first word will distinguish between dial pulse and MF digit reception. Additionally, once every 125 milliseconds (during selected ones of the 25-millisecond interrupt periods) the Program-Controlled Processor examines the SND and NDG flags of each originating register for an indication that work is to be performed. At these 125-millisecond times the Program-Controlled Processor performs work operations with respect to the reception of dial pulses. If the 125-millisecond period coincides with a 50-millisecond interval work relative to the reception of signals from TOUCH-TONE stations and MF trunks will be performed. Furthermore, at both the 50-millisecond intervals and at the 125-millisecond intervals the Program Controlled Processor 200 performs work with respect to digit sending.

As previously explained, the NDG flag will be in the "1" state when a new digit has been received from a TOUCH-TONE station, from a trunk employing multifrequency signaling, or from a subscriber station employing dial pulse signaling. The NDG flag is set to the "1" state once every 125 milliseconds and is reset by the Wired Logic Processor 600 when changes occur on dial pulse lines or trunks and when a change has not been recognized by a TOUCH-TONE or MF receiver circuit. The NDG flag being in the "1" state indicates that the information in bit positions 8–15 of word 2 of the originating register is to be moved to a digit storage area. The proper digit storage area is indicated by the "incoming digit count" in bit positions 4–7 of word 4 of the originating register. Each time that information is moved from the incoming digit area to one of the digit storage areas in words 5–8 of the originating register, the Program-Controlled Processor increments the incoming digit count. The 50-millisecond or 125-millisecond interrupt program sequence translates the information in bit positions 8–15 (the incoming digit area) of word 2 of the OR from the form in which it was stored to a binary coded decimal digit for placement in the digit storage area.

If the SND flag is found to be in the "1" state, the program will examine the contents of the outgoing pulse count in bit positions 4–7 of word 2 of the originating register. As previously discussed, the outgoing pulse count is set to the value zero when dial tone is connected to a calling line or trunk, to the value fifteen when dial tone is not connected and sending is not being performed, and is set to values other than 0, 15, or 1 when sending is being performed. If the program finds the outgoing pulse count to have the value zero, steps will be initiated to disconnect dial tone and the outgoing pulse count will be set to the value fifteen, which indicates that dial tone is being turned off and that sending has not yet started. Dial tone is provided by the digit detection receiver circuit which is connected to the calling line or trunk via the Switching Network 102 of FIG. 1 and dial tone is removed by means of a peripheral order which is originated by an interrupt program sequence.

As digits are accumulated they are examined by a base level call-processing sequence to determine the call destination. For example, the assembled digits may be examined after 1, 2, 3, and 7 digits have been accumulated. Operator calls will be recognized by examination of one digit; and calls employing special coded signals, such as the asterisk on a TOUCH-TONE telephone, will be recognized by examination of two or more digits. Interoffice calls can be recognized upon receipt of the first three digits. Intraoffice calls can be recognized after three digits and their destinations determined upon receipt of seven digits.

After the destination of the call has been determined by such examination of the assembled digits, steps must be taken to assign the appropriate paths through the network and the appropriate trunks and service circuits to effect the desired connections. In the case of an interoffice call, a trunk to the distant office must be assigned along with an appropriate digit transmitter and a path interconnecting the assigned trunk and digit transmitter. These assignments are made by base level program sequences which also assign a "peripheral order buffer" (POB). There are a plurality of "peripheral order buffers" (POB's) and each comprises 16 words in the shared Memory 201. One word of each POB contains a progress mark which performs a function like the progress mark stored in the Transient Call Register of FIG. 16. The progress marks comprise the memory address of the program which is executed to carry out the work functions required by that progress mark. Certain progress marks which require the performance of extensive work functions utilize work lists which are permanently stored in the Program Memory 300. A second word contained in the POB is a "work list pointer." The pointer is the memory address of the required work list. There are a plurality of work lists which are designed to perform different jobs. The remaining 14 words of the POB contain data relative to the call. This data is employed in the execution of the progress mark program sequences and in the performance of the work lists.

Peripheral order buffers are examined during a 25-millisecond interrupt program sequence which repeats at 50-millisecond intervals.

Trunk circuits to distant offices terminate in a variety of equipments at those distant offices. Certain trunks terminate in MF signaling receivers while others terminate in dial-pulse-signalling receivers. In the case in which MF signaling receivers are employed, the digit sending is performed wholly by the Program Controlled Processor 200. In the case in which dial pulse sending is employed, the sending function is performed jointly by the Program Controlled Processor 200 and the Wired Logic Processor 600. In the case of MF digit sending, all digits are assembled in the originating register prior to the time that digit sending is initiated. In the case of dial pulse digit sending, the sending function may, in certain instances, overlap the digit reception function. As previously explained, incoming signaling information is assembled in the incoming digit area of word 2 of the originating register by the Wired Logic Processor 600 and a record of dial pulse outpulsing is maintained in the originating register by the Wired Logic Processor 600. The Wired Logic Processor simultaneously performs digit reception and digit transmission functions without interference.

In the event that dial pulse digit transmission is to be performed, a dial pulse sender circuit (see FIG. 21) will be connected to the trunk circuit via the Switching Network 102. The Program-Controlled Processor makes this assignment and by execution of entries in the POB establishes the desired connection, controls the trunk circuit and the sender circuit, and initializes portions of the assigned originating register. During dial pulse sending the outgoing trunk circuit (see FIG. 22) is placed in the bypass state wherein the C relay thereof is operated and the A and B relays are released. Under these conditions there is a direct DC connection between the terminals TO and TI and between the terminals RO and RI. The ferrod sensors which serve to monitor the transmission conductors to the network and the transmission conductors to the distant office are disconnected from their respective transmission conductors. During digit-sending supervision of the trunk is transferred from the trunk circuit which has been placed in the bypass state to the digit sender circuit. The ferrods which supervise the trunk circuit must be capable of detecting that loop current is flowing in the circuit and must be capable of recognizing the polarity of the loop current. A reversed battery condition is employed as a signal from the distant office to the sending office. For example, reverse battery loop signaling is employed to indicate that outpulsing may proceed and a change of polarity, which change is detected during an outpulsing interdigital period, indicates that sending should be temporarily halted until the distant office indicates that it is prepared to receive additional digits.

When it has been determined that dial pulse digit sending is required, the originating register associated with the call is adjusted to initiate the functions of the Wired Logic Processor. The OPS bit in bit position 14 of word 1 is set to the "0" or "1" state to specify the outpulsing rate (10 p.p.s. or 20 p.p.s.) and the outgoing pulse count in bit positions 4–7 is set to the value two. Additionally, the outgoing digit count in bit positions 0–3 of word 4 of the originating register is set to the value which defines the digit location on the first digit to be transmitted and the stop-sending code in bit positions 8–11 of word 4 is set to a value which indicates how many digits are to be outpulsed.

The Wired Logic Processor proceeds to serve the originating registers as described earlier herein, and among the functions it performs is the decrementing of the outgoing pulse count in word 2. When the outgoing pulse count is decremented from its initial value two to the new value one, the Wired Logic Processor 600 sets the SND flag. Subsequently, during the execution of one of the 50-millisecond interrupt program sequences, the Program-Controlled Processor finds the SND bit to be in the "1" state and then proceeds to examine the outgoing pulse count and finds it to be set to the value one. This indicates that outpulsing has started and that the pulse count of the next digit to be transmitted must be placed in the outgoing pulse count area (bits 4–7 of word 2). Only by evaluation of the outgoing digit count would the Program-Controlled Processor be able to recognize that outpulsing has not yet started. At the time that the new digit count is placed in the outgoing pulse count area, the Program Controlled Processor 200 sends a control signal to the appropriate digit-sending circuit via the Peripheral Access Circuit 120. The control signal will indicate that the sender circuit is to be transmitting pulses at 10 p.p.s. or at 20 p.p.s., and once this signal has been applied to the sender circuit it will proceed to send out well timed dial pulses in accordance with the occurrence of the seize and release pulses which have been selected.

Figure 21:
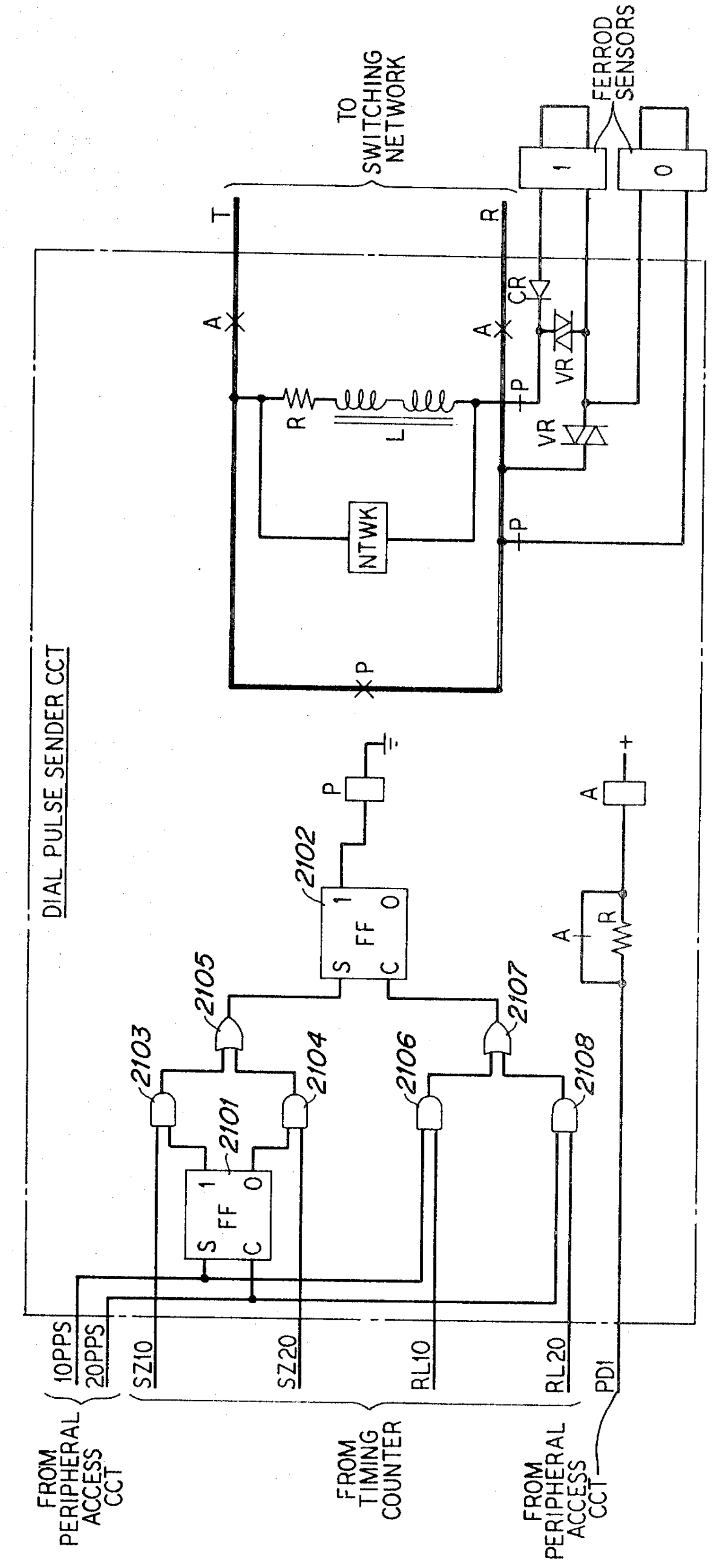
FIG. 21 is a schematic diagram of a dial pulse sender circuit.
Figures 22, 22A:
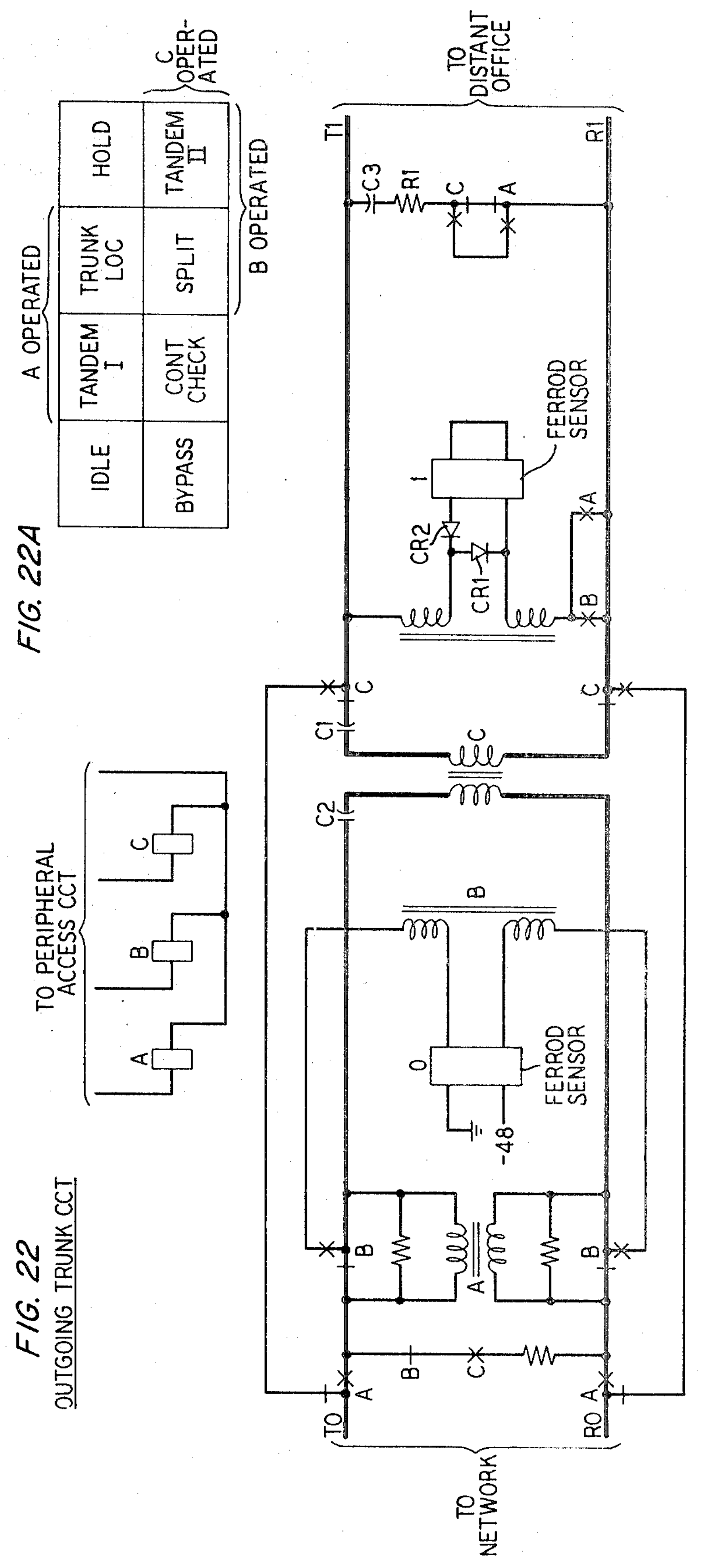
FIG. 22 is a schematic diagram of an output trunk circuit.
FIG. 22A is a state diagram for the trunk circuit.

A dial pulse sender circuit is shown in FIG. 21. The dark lines labeled T and R comprise the transmission terminals which are connected via the switching network to the trunk circuit over which outpulsing is to be performed. The relay A is controlled by commands of the Program Controlled Processor 200 which are transmitted to the sender circuit by the Peripheral Access Circuit 120. The A relay serves to complete the transmission path of the dial pulse sender circuit. The two ferrod sensors (0 and 1) appear in the trunk scanner 105 which is controlled by commands from the Program Controlled Main Processor 200. The zero ferrod is not sensitive to the polarity of potential applied across the conductors T and R at the trunk circuit in the distant office. However, the ferrod "1," because of a diode CR in series therewith, is sensitive to the polarity of the potential which is applied across the conductors T and R. It should be noted that the potential is applied by the trunk circuit at the distant office as the trunk circuit in the same office as the dial pulse sender is in the bypass state during dial pulse outpulsing.

Figure 20:
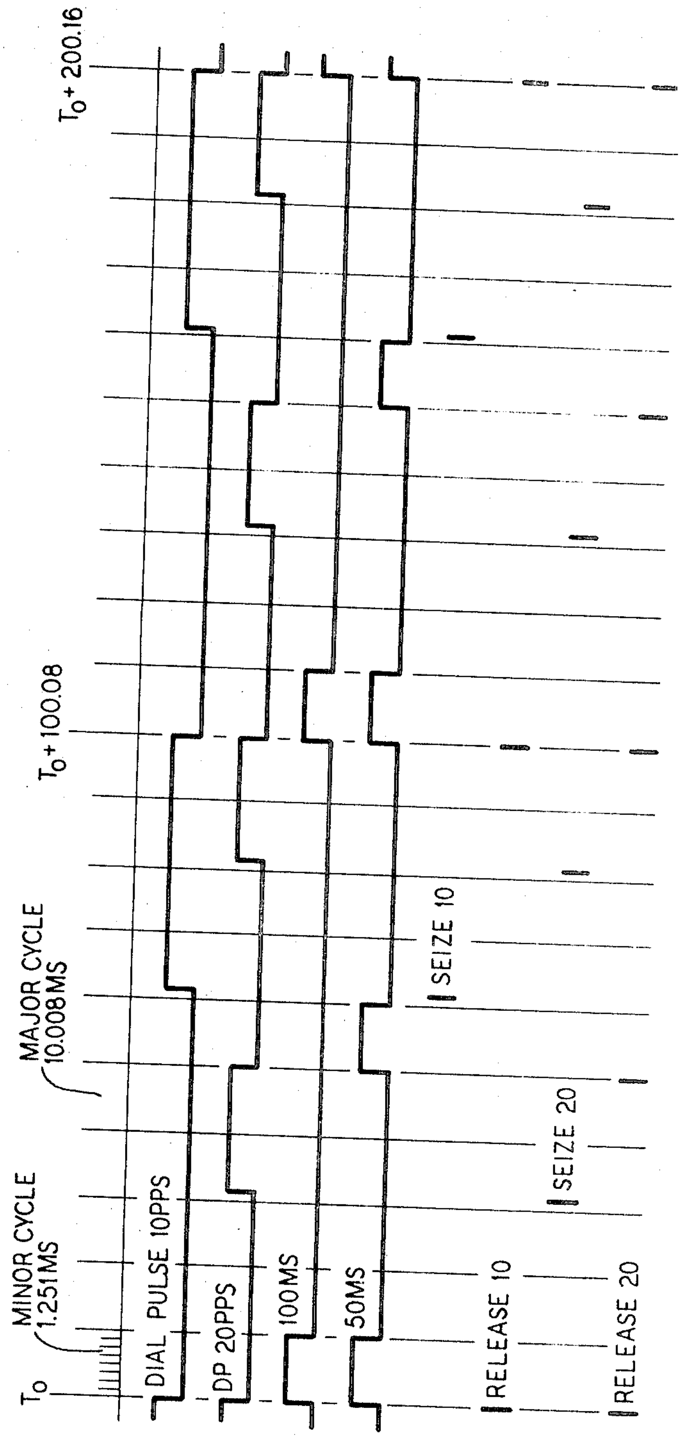
FIG. 20 is a timing diagram.

The dial pulse sender circuit of FIG. 21 is arranged to selectively transmit 10 p.p.s. and 20 p.p.s. dial pulses. The P relay is in the operated state when the flip-flop 2101 is in the "1" state and is in the released state when the flip-flop 2102 is in the "0" state. Off-hook supervision is transmitted to the distant office when the P relay is in the operated state. A dial pulse comprises a break interval (on-hook state signal) followed by an off-hook state signal. Considering the total time duration of the break interval and the make interval to have the value one, the duration of the break interval is approximately 0.6 and the make interval is 0.4 of the total interval. The wave shapes of 10 p.p.s. and 20 p.p.s. dial pulses and the time of occurrence of the related seize and release pulses are shown in FIG. 20. These pulses are shown in relation to the occurrence of the 50 MS and 100 MS output pulses of the timing counter 801 and are shown in relationship to a minor cycle.

The sender circuit is seized by operation of the A relay to complete the transmission path over the conductors T and R and dial pulse sending is initiated by enabling signals on the conductors 10 p.p.s. and 20 p.p.s. which respectively serve to initiate 10 p.p.s. and 20 p.p.s. dial pulse sending.

When the conductor 10 p.p.s. is enabled the flip-flop 2101 will be set to the "1" state. The gate 2103 is enabled when the flip-flop 2101 is in the set state and this serves to gate signals on the conductor SZ10 to the set terminal of the flip-flop 2102 via the OR-gate 2105. During the time that the 10 p.p.s. conductor is enabled the AND-gate 2106 will be enabled and this serves to gate signals on the conductor RL10 to the C or clear terminal of the flip-flop 2102 via the OR-gate 2107. A signal on conductor 10 p.p.s. is always generated between the occurrence of a pulse on the conductor SZ10 and a pulse on the conductor RL10 and cannot occur between the occurrence of a pulse on the conductor RL10 and a succeeding pulse on conductor SZ10. Similarly, if 20 p.p.s. outpulse is being performed, an enabling signal on the conductor 20 p.p.s. always occurs between a signal on the conductor SZ20 and a signal on RL20. While the conductor 10 p.p.s. is enabled the flip-flop 2102 will go to the "0" and to the "1 " states in accordance with the appearance of signals on the conductors RL10 and SZ10, respectively. The contacts of the relay P follow the state of the flip-flop 2102 and serve to generate 10-pulse-per-second dial pulses over the transmission conductors T and R. The timing conductors SZ10 and RL10, SZ20 and RL20 are distributed to all dial pulse sender circuits. Accordingly, there is synchronism between the dial pulses generated by all active sender circuits which are enabled to transmit at the same outpulsing rate. For example, the dial pulse output signals of all active sender circuits which are transmitting 10-pulse-per-second dial pulses are synchronized.

As previously explained, the Wired Logic Processor 600 decrements the outgoing pulse count in the originating register at a rate which corresponds to the dial pulse outpulsing rate. When the outpulsing count reaches the critical value "one" the SND flag of the originating register is set to "1" and the Program Controlled Processor 200 subsequently detects that outpulsing on a particular call is to be terminated. Outpulsing is terminated by removing the control signal from the appropriate one of the conductors 10 p.p.s. and 20 p.p.s. If the dial pulse sender circuit is sending 10-pulse-per-second dial pulses, the conductor 10 p.p.s. is enabled and outpulsing is terminated by removing the signal on the conductor 10 p.p.s. This serves to disable the AND-gate 2106 and thus prevents further signals on the conductor RL10 from reaching the C terminal of the flip-flop 2102. The flip-flop 2101, however, remains in the set state and the pulses SZ10 are continually gated through the gates 2103 and 2105 to the S terminal of the flip-flop 2102. These pulses serve to place the flip-flop 2102 in the "1 " state and thus operate the P relay to provide an off-hook signal to the distant trunk circuit. The signal on the control conductor 10 p.p.s. may be removed at any time after the occurrence of the last RL10 pulse of a sequence. The flip-flop 2102 will remain in the "0" state until the next signal occurs on the conductor SZ10. Similarly, when 20 p.p.s. dial pulsing is being performed, the signal on the control conductor 20 p.p.s. may be removed at any time after the occurrence of the last pulse of a sequence on conductor RL10. Advantageously, dial pulse outpulsing is performed with a high degree of timing precision (in synchronism with the signals on the conductors RL10, SZ10, RL20, and SZ20) while the actions of the Program-Controlled Processor may be performed without a high degree of timing precision.

The Wired Logic Processor 600 will, as earlier described, decrement the count in the outgoing pulse count area (bits 4–7 of word 2) at a rate which coincides with the rate at which the chosen seize and release pulses occur. That is, if 10 p.p.s. outpulsing has been selected the SZ10 and RL10 pulse pairs will occur once every 100 milliseconds; and similarly, the count in the outgoing pulse count area will be decremented once every 100 milliseconds by the Wired Logic Processor 600. Again, when the SND flag is set by the Wired Logic Processor to indicate that the outgoing pulse count has reached the value one, this flag will be recognized by the Program-Controlled Processor as an indication that further output work is required. After the first digit of the sequence has been outpulsed, the Program Controlled Processor 200 will remove the previously applied control signal from the dial pulse sender circuit and will take steps to initiate an outpulsing interdigital timing period. An interval of 600 milliseconds is permitted to pass before initiating the next digit of the sequence. Interdigital timing is performed by placing an appropriate count in the outgoing pulse count area of word 2. In the event that 10 p.p.s. outpulsing is being employed, the outgoing pulse count is set to the value seven. Since, at the 10 p.p.s. rate this value will be decremented by one each 100 milliseconds, the outgoing pulse count will reach the critical value of one 600 milliseconds after timing has been initiated.

The Program-Controlled Processor will again recognize that the SND flag is set to one and will proceed to transfer the next digit in the sequence from its digit storage area to the outgoing pulse count area. Thus digit sending will proceed in an orderly manner and the Wired Logic Processor 600 will serve to time both outpulsing periods of time and interdigital periods of time. After outpulsing has been completed additional control signals will be transmitted to return trunk supervision to the trunk circuit which was priorly in the bypass state and to release the sender circuit and the network path which was employed in connecting the sender circuit to the outgoing trunk circuit. Additionally, a connection is established between the calling line and the outgoing trunk circuit.

Figure 17:
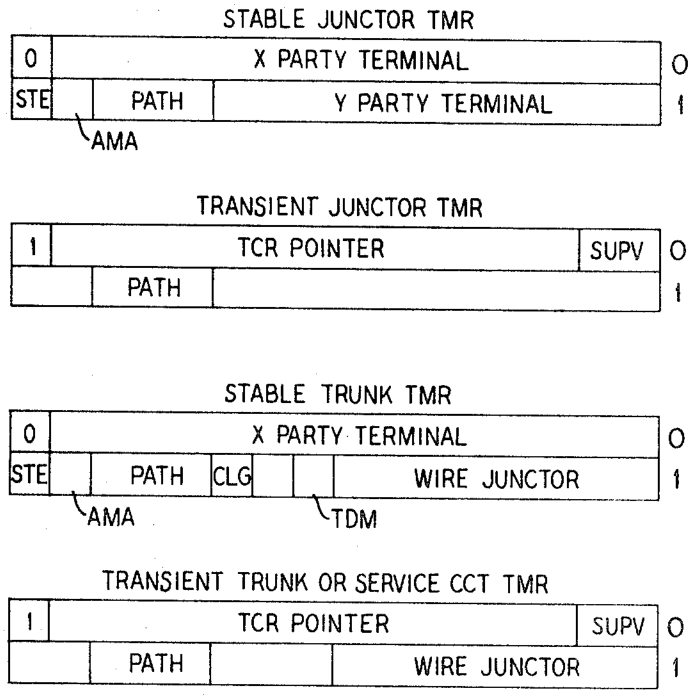
FIG. 17 illustrates the makeup of a terminal register.
Figure 18:
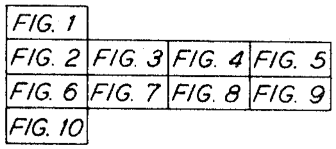
FIG. 18 is a key sheet showing the arrangement of FIGS. 1 through 11 above.

In the case of an interoffice call the record of the call while in the transient state is maintained in the originating register and in the Terminal Memory Record of the trunk circuit which is employed in the call. In the case of an intraoffice call a junctor circuit and its associated Terminal Memory Record are assigned to the call. As seen in FIG. 17, word 0 of a Terminal Memory Record contains a coded TCR pointed entry which serves to associate the Terminal Memory Record and the currently assigned Transient Call Register. In this one illustrative switching system ringback (audible tone) is provided by the junctor circuits and in the case of calls terminating in this switching system ringing current is supplied by a separate service circuit.

After the information which has been gathered in an originating register of FIG. 15 has been utilized and the desired connections established or released, the originating register may be released for further assignment. While establishing a connection the Transient Call Register is retained until such time as an answer has been detected, ringing the ringback have been disconnected, and the call has reached the stable state. When the stable state has been reached, the appropriate Terminal Memory Records are updated to indicate that the call is in the stable state and then the Transient Call Register is released for further assignment. In the case of an intraoffice call the Terminal Memory Record comprises a single TMR which is permanently assigned to the junctor circuit serving the call. In the case of an interoffice call the Terminal Memory Record comprises the TMR for the trunk which is serving the call.

One of the maintenance functions which is carried out by the Program Controlled Processor 200 is an audit function. Since the network paths and the various records of the states of these paths are controlled independently of each other, there is always the possibility that the records in memory are not consistent with the actual states of the circuit elements. Accordingly, from time to time audits are performed to remove inconsistent information and to make any possible corrections in the system data.

We have described but on e illustrative application of the principles of our invention and to one skilled in the art many other applications of these principles are obvious. For example, although the principles of this invention have been described in the terms of a telephone switching office, such principles may be applied in the fields of process control and computing, generally.

What is claimed is:

1. In a telephone switching system, a switching network, a plurality of lines connected to said switching network, a plurality of trunk circuits connected to said switching network, a plurality of dial pulse trunks interconnecting corresponding ones of said trunk circuits and trunk circuits located in a distant switching system, said distant switching system arranged to receive dial pulse call signaling information over said dial pulse trunks, a word-organized bulk memory means, a plurality of originating registers, each of said registers comprising a plurality of successive word locations in said bulk memory means,
means for generating timing signals,
means for detecting requests for service from said lines,
means for temporarily assigning an originating register to each said request for service,
means responsive to call-signaling information from a line assigned to an originating register for recording said call-signaling information in said assigned originating register,
a plurality of dial-pulse-sending circuits for generating dial pulse signals, said plurality of sending circuits connected to a common source of signals for defining dial pulses,
means responsive to said call-signaling information recorded in said originating register for assigning one of said dial pulse trunks and one of said dial-pulse-sending circuits to the call served by said originating register and for controlling said switching network to establish a connection between said assigned dial pulse trunk and said sending circuit,
means for defining a portion of said call-signaling information to be employed to control said dial-pulse-sending circuit,
means responsive to said defined portion of said call-signaling information for enabling said dial-pulse-sending circuit,
means responsive to said timing signals for decrementing the count in said defined portion of said call-signaling information by a count of "1" at a rate which corresponds to the outpulsing rate of said enabled sending circuit, and
means for disabling said dial-pulse-sending circuit to terminate outpulsing when the count in said defined portion of said call-signaling information has reached a critical count.

2. A data processing system comprising:
a first control means;
a second control means;
a memory shared by said first and said second control means;
timing means for generating output signals defining recurring basic time cycles, a plurality of times within said basic time cycles and pluralities of said basic time cycles;
a plurality of register circuits, each of said register circuits comprising a plurality of successive word locations in said shared memory, a first word of each of said registers comprising data for controlling said second control means, a second word of each of said registers containing data generated by said second control means and employed by both said first and said second control means;
a plurality of devices which are to be individually enabled for differing periods of time in accordance with data stored in corresponding ones of said registers;
said first control means being responsive to information obtained from said registers for enabling corresponding ones of said devices;
means in said second control means responsive to output signals of said timing means for periodically altering certain data in said registers, said certain data defining the periods of time that said corresponding output devices are to be enabled and means for setting a flag bit in said second word of said registers when said altered data indicates that the end of said period of time has occurred;
said first control means further comprising means responsive to said flag bits for individually disabling said output devices.

3. In a telephone switching system wherein call signaling information is stored in a register means which is temporarily assigned to a call origination and wherein there are a plurality of said register means, each of said register means comprising a plurality of successive word locations in a first memory, the system further comprising:
timing means;
a program-controlled processor comprising a second memory containing sequences of program order words and data and a control means for executing said sequences of program order words and for reading information from and writing information into said first memory;
a wired logic data processor comprising means for reading information from said first memory, for interpreting said information and other data and for writing new information into said first memory;
a plurality of dial-pulse-sending circuits connected to a common source of signals for defining dial pulse transitions,
said program controlled processor comprising means for temporarily assigning said dial-pulse-sending circuits on an individual basis to said registers and means for selectively enabling said dial-pulse-sending circuits in accordance with data obtained from said assigned ones of said registers;
said wired logic data processor comprising means responsive to output signals of said timing means for modifying said data in said registers and means to selectively place indicia in said registers for indicating that the corresponding dial-pulse-sending circuits are to be disabled; and
said program controlled processor in response to said indicia disabling said dial-pulse-sending circuits.

4. In a telephone switching system:
a dial pulse timing signal source,
a plurality of dial-pulse-sending circuits connected to said timing signal source, each said sending circuit comprising an enable input terminal,
memory means for maintaining a record of information to be transmitted in dial pulse form by said dial-pulse-sending circuits,
means responsive to the contents of said memory means for generating signals for enabling and disabling said dial-pulse-sending circuits, and
means independent of said last-named means for altering the record in said memory at a rate which corresponds to the dial-pulse-sending rate.

5. A telephone switching system in accordance with claim 4 wherein said dial-pulse-timing signal source comprises means for generating dial pulse signals at a plurality of rates;
said information maintained in said memory means comprises dial pulse rate control information; and
said means for generating signals for enabling and disabling is responsive to said dial pulse rate control information for selectively enabling said dial-pulse-sending circuits to transmit dial pulses in accordance with a selected one of said plurality of rates.

6. In a telephone switching system comprising a plurality of originating registers which are temporarily assigned on an individual basic to call originations, each register comprising a plurality of successive word locations in a temporary memory wherein call-signaling information is recorded, the improvement comprising:
a plurality of dial-pulse-sending circuits connected to a common source of dial pulse timing signals,
means responsive to call-signaling information read from said originating registers for selectively enabling said dial-pulse-sending circuits and for temporarily assigning said dial-pulse-sending circuits to said originating registers on an individual basis and for entering in fixed word locations in said memory information defining the successive digits to be outpulsed by said dial-pulse-sending circuits; and
means independent of said last-named means for altering said digit information stored in each said fixed word location at a rate which corresponds to the rate of said dial-pulse-timing signals and means responsive to said altered information for setting a flag bit in said register; and
means responsive to said flag bits for selectively disabling said dial-pulse-sending means.

* * * * *

UNITED STATES PATENT OFFICE
CERTIFICATE OF CORRECTION

Patent No. 3,627,954 Dated December 14, 1971

Inventor(s) Thomas M. Quinn

It is certified that error appears in the above-identified patent and that said Letters Patent are hereby corrected as shown below:

Serial No. should be 868,024. Column 1, line 16, after "memories" insert --performs--; line 17, after "other" delete "comprising a control unit and" and substitute --prior--. Column 4, line 61, "work" should read --word--; line 67, "circuit" should read --circuits--. Column 6, line 67, "quote" should read --quota--. Column 7, line 31, delete "Controlled " second occurrence; line 58, "quote" should read --quota--; line 72, delete "Controlled " second occurrence. Column 8, line 4, "of 408" and continuing through "and the" of Column 8, line 64 should be deleted and inserted in column 9, line 23 between "count" and "CPD". Column 8, line 66, after "200" delete "the" and substitute --to--. Column 10, line 39, before "groups" delete "a". Column 16, line 18, after "inputs" delete "the" and substitute --to--; line 31, after "pulse" delete "ac-"; line 38, "conductors" should read --conductor--; line 41, "Conduction" should read --Conductor--. Column 17, line 23, "changed" should read --change--. Column 24, line 11, "of", second occurrence, should read --by--; line 34, "not" should read --now--. Column 28, line 11, "information" should read --instruction--; line 22, "DFHL" should read --DFH1--; line 36, "0" should read --"0's"--; line 53, "DFHL" should read --DFH1--. Column 29, line 12, "552" should read --522--; line 28, after "register" delete the parenthesis. Column 30, line 71, "canner" should read --scanner--. Column 31, line 10, "or" should read --of--; line 15, "section" should read --detection--. Column 36, line 36, "the" should read --and--. Claim 6, line 52, "basic" should read --basis--.

Since the line numbering in the patent does not agree with the printed lines all above references are to the actual line count.

Signed and sealed this 4th day of July 1972.

(SEAL)
Attest:

EDWARD M.FLETCHER,JR.
Attesting Officer

ROBERT GOTTSCHALK
Commissioner of Patents

FORM PO-1050 (10-69)

USCOMM-DC 60376-P69
☆ U.S. GOVERNMENT PRINTING OFFICE : 1969 O—366-334